(12) United States Patent
Seo

(10) Patent No.: US 11,941,204 B2
(45) Date of Patent: Mar. 26, 2024

(54) DISPLAY DEVICE

(71) Applicant: Samsung Display Co., Ltd., Yongin-Si (KR)

(72) Inventor: Myeong Hee Seo, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 9 days.

(21) Appl. No.: 17/968,566

(22) Filed: Oct. 18, 2022

(65) Prior Publication Data

US 2023/0176687 A1 Jun. 8, 2023

(30) Foreign Application Priority Data

Dec. 2, 2021 (KR) .................. 10-2021-0170877

(51) Int. Cl.
*G06F 3/041* (2006.01)
*G06F 3/044* (2006.01)

(52) U.S. Cl.
CPC ...... *G06F 3/04166* (2019.05); *G06F 3/04184* (2019.05); *G06F 3/0446* (2019.05)

(58) Field of Classification Search
CPC . G06F 3/04166; G06F 3/04184; G06F 3/0446
See application file for complete search history.

(56) References Cited

U.S. PATENT DOCUMENTS

| | | | | |
|---|---|---|---|---|
| 10,229,964 B2* | 3/2019 | Kim | ............. | H10K 59/124 |
| 10,483,341 B2* | 11/2019 | Jung | ............. | G09G 3/20 |
| 10,490,119 B2* | 11/2019 | Kim | ............. | G09G 3/3233 |
| 10,490,122 B2* | 11/2019 | Kim | ............. | G09G 3/3266 |
| 10,504,446 B2* | 12/2019 | Kim | ............. | H10K 59/352 |
| 10,546,527 B2* | 1/2020 | Pyo | ............. | G09G 3/3233 |
| 10,636,859 B2* | 4/2020 | Park | ............. | H01L 27/1255 |
| 2017/0249896 A1* | 8/2017 | Kim | ............. | G09G 3/3266 |
| 2018/0005585 A1* | 1/2018 | Kim | ............. | H10K 59/131 |
| 2018/0090061 A1* | 3/2018 | Kim | ............. | G09G 3/3233 |
| 2018/0240856 A1* | 8/2018 | Kim | ............. | H10K 59/1213 |
| 2018/0342572 A1* | 11/2018 | Park | ............. | G09G 3/3266 |
| 2019/0096978 A1* | 3/2019 | Jung | ............. | G09G 3/3275 |
| 2019/0130825 A1* | 5/2019 | Pyo | ............. | G09G 3/3233 |
| 2019/0206978 A1* | 7/2019 | Kim | ............. | H10K 59/131 |
| 2020/0090584 A1* | 3/2020 | Kim | ............. | H10K 59/88 |
| 2020/0098310 A1* | 3/2020 | Kim | ............. | H10K 50/805 |

(Continued)

FOREIGN PATENT DOCUMENTS

KR 20120091980 A 8/2012

*Primary Examiner* — Michael Pervan
(74) *Attorney, Agent, or Firm* — Innovation Counsel LLP

(57) ABSTRACT

The present disclosure relates to a display device that can reduce a difference between the load connected to scan lines around a notch area and the load connected to scan lines in the entire display area. According to an embodiment of the disclosure, a display device comprising a display panel comprising a display area that includes a first display area, and a second display area and a third display area disposed adjacent to the first area, a touch detector, a scan driver circuit, and a touch driver circuit supplying a touch driving signal to touch electrodes of the touch detector, wherein the touch driver circuit changes a pulse width or an output timing of the touch driving signal while images are displayed on at least one of the first to third display areas and supplies the touch driving signal to the touch electrodes.

20 Claims, 18 Drawing Sheets

(56) References Cited

U.S. PATENT DOCUMENTS

| 2020/0118496 A1* | 4/2020 | Kim | H10K 59/352 |
| 2020/0194461 A1* | 6/2020 | Park | H01L 27/1255 |
| 2020/0258973 A1* | 8/2020 | Park | H10K 59/124 |

* cited by examiner

DISPLAY DEVICE

This application claims priority to Korean Patent Application No. 10-2021-0170877 filed on Dec. 2, 2021, in the Korean Intellectual Property Office, and all the benefits accruing therefrom under 35 U.S.C. 119, the contents of which in its entirety are herein incorporated by reference.

BACKGROUND

1. Field of the Disclosure

The present disclosure relates to a display device.

2. Description of the Related Art

As the information-oriented society evolves, various demands for display devices are ever increasing. For example, display devices are being employed by a variety of electronic devices such as smart phones, digital cameras, laptop computers, navigation devices, and smart televisions. Display devices may be flat panel display devices such as a liquid-crystal display device, a field emission display device, and a light-emitting display device.

A display device may include a display panel having a display area where images are displayed and a non-display area where no image is displayed; and a variety of sensor devices for sensing light such as a camera sensor, an illuminance sensor and an infrared sensor. In the display area of the display panel, scan lines from which scan signals are applied, data lines from which data voltages are applied, and pixels connected to the scan lines and the data lines may be formed.

The display area of the display panel may be formed such that it does not overlap sensor devices. Accordingly, one side of the display area of the display panel may have a notch shape, i.e., a part of the side is recessed when viewed from the top. In such case, the number of pixels connected to each of the scan lines around the notch area is different from the number of pixels connected to each of the scan lines in an area other than the notch area. Accordingly, the load connected to the each of the scan lines around the notch area may be different from that connected to each of the scan lines in the area other than the notch area. As a result, the pulse width differs from scan signal to scan line, and there may be a difference in luminance between the pixels. In particular, such a difference in luminance around the notch area may become larger if other signals such as a touch driving signal are applied when the data lines of the pixels are floating due to coupling effects.

SUMMARY

Aspects of the present disclosure provide a display device that can reduce a difference between the load connected to scan lines around a notch area and the load connected to scan lines in the entire display area.

Aspects of the present disclosure also provide a display device that can reduce the influence on pixels around the notch area by other driving signals such as a touch driving signal.

It should be noted that objects of the present disclosure are not limited to the above-mentioned object; and other objects of the present disclosure will be apparent to those skilled in the art from the following descriptions.

According to an embodiment of the disclosure, a display device comprising a display panel comprising a display area that includes a first display area, a second display area disposed adjacent to one side of the first display area, and a third display area disposed adjacent to the one side of the first area to be spaced apart from the second display area with a notch area disposed therebetween a touch detector formed on a front surface of the first to third display areas to sense a user's touch; a scan driver circuit sequentially supplying scan signals to scan lines of the first to third display areas, respectively; and a touch driver circuit supplying a touch driving signal to touch electrodes of the touch detector, wherein the touch driver circuit changes a pulse width or an output timing of the touch driving signal while images are displayed on at least one of the first to third display areas and supplies the touch driving signal to the touch electrodes.

In an embodiment, an area of each of the second and third display areas is smaller than an area of the first display area, and wherein the scan driver circuit sequentially supplies scan signals corresponding to scan lines of the second and third display areas, and then sequentially supplies scan signals corresponding to scan lines of the first display area.

In an embodiment, the touch driver circuit generates the touch driving signal in a form of pulses which swings at least once during each horizontal line driving period and supplies the touch driving signal to the touch electrodes at least once during the each horizontal line driving period, and the pulse width of the touch driving signal is smaller than the each horizontal line driving period of a horizontal synchronization signal.

In an embodiment, the touch driver circuit generates the touch driving signal so that the touch driving signal is overlapped with a supply period of at least one of first to third scan signals while the first to third scan signals are supplied to first to third scan lines of the second and third display areas, and supplies the touch driving signal to the touch electrodes.

In an embodiment, the touch driver circuit generates the touch driving signal so that the touch driving signal is overlapped with a supply period of at least one of first to third scan signals while the first to third scan signals are supplied to first to third scan lines of the second and third display areas, and supplies the touch driving signal to the touch electrodes.

In an embodiment, the touch driver circuit generates the touch driving signal so that a rising edge of the touch driving signal is overlapped with the supply period of at least one of the first to third scan signals and supplies the touch driving signal to the touch electrodes.

In an embodiment, the touch driver circuit generates the touch driving signal so that the touch driving signal is overlapped with a supply period of a second scan signal while the first to third scan signals are supplied to first to third scan lines of the second and third display areas, and supplies the touch driving signal to the touch electrodes.

In an embodiment, the touch driver circuit generates the touch driving signal so that a rising edge of the touch driving signal is overlapped with the supply period of the second scan signal and supplies the touch driving signal to the touch electrodes.

In an embodiment, the scan driver circuit generates the scan signals so that a pulse width of first to third scan signals applied to sub-pixels of the second and third display areas is smaller than a pulse width of first to third scan signals applied to sub-pixels of the first display area and supplies the scan signals corresponding to the second and third display areas to first to third scan signal lines of the second and third display areas.

In an embodiment, the touch driver circuit generates the touch driving signal so that a pulse width of the touch driving signal generated while images are displayed on the second and third display areas is larger than a pulse width of the touch driving signal generated while images are displayed on the first display area, and wherein the touch driver circuit supplies the touch driving signal so that a rising edge of the touch driving signal is overlapped with the supply period of one of the first to third scan signals while the first to third scan signals are supplied to the first to third scan lines of the second and third display areas.

In an embodiment, the touch driver circuit generates the touch driving signal so that a pulse width of the touch driving signal generated while images are displayed on the second and third display areas is smaller than a pulse width of the touch driving signal generated while images are displayed on the first display area, and wherein the touch driver circuit supplies the touch driving signal so that a rising edge of the touch driving signal is overlapped with the supply period of one of the first to third scan signals while the first to third scan signals are supplied to the first to third scan lines of the second and third display areas.

In an embodiment, the touch driver circuit delays the touch driving signal by a predetermined delay period while the first to third scan signals are sequentially supplied to first to third scan lines of the second and third display areas, and wherein the touch driver circuit supplies the touch driving signal to the touch electrodes so that a rising edge of the touch driving signal is overlapped with a supply period of one of the first to third scan signals while the first to third scan signals are supplied to first to third scan lines of the second and third display areas.

In an embodiment, the touch driver circuit generates the touch driving signal so that a pulse width of the touch driving signal generated while images are displayed on the first display area is larger than or smaller than a pulse width of the touch driving signal generated while images are displayed on the second and third display areas, and wherein the touch driver circuit outputs the touch driving signal so that a rising edge of the touch driving signal is overlapped with a supply period of the scan signals while images are displayed on the first display area.

According to an embodiment of the disclosure, a display panel comprising a display area that includes a first display area, a second display area disposed adjacent to one side of the first display area, and a third display area disposed adjacent to the one side of the first area to be spaced apart from the second display area with a notch area disposed therebetween, a touch detector formed on a front surface of the first to third display areas to sense a user's touch, a scan driver circuit changing a pulse width of scan signals while images are displayed on at least one of the first to third display areas and supplying the scan signals to scan lines of the first to third display areas, and a touch driver circuit changing a pulse width or output timing of the touch driving signal while images are displayed on at least one of the first to third display areas and supplying the touch driving signal to touch electrodes of the touch detector.

In an embodiment, the scan driver circuit generates the scan signals so that a pulse width of first to third scan signals applied to sub-pixels of the second and third display areas is smaller than a pulse width of first to third scan signals applied to sub-pixels of the first display area and supplies the scan signals to first to third scan signal lines of the second and third display areas.

In an embodiment, the touch driver circuit generates the touch driving signal so that a falling edge of the touch driving signal is overlapped with a supply period of at least one of first to third scan signals while the first to third scan signals are supplied to first to third scan lines of the second and third display areas, and supplies the touch driving signal to the touch electrodes.

In an embodiment, the touch driver circuit generates the touch driving signal so that a falling edge of the touch driving signal is overlapped with a supply period of the second scan signal while the first to third scan signals are supplied to first to third scan lines of the second and third display areas, and supplies the touch driving signal to the touch electrodes.

In an embodiment, the touch driver circuit generates the touch driving signal so that a pulse width of the touch driving signal generated while images are displayed on the second and third display areas is larger than a pulse width of the touch driving signal generated while images are displayed on the first display area, and wherein the touch driver circuit supplies the touch driving signal so that a falling edge of the touch driving signal is overlapped with a supply period of one of the first to third scan signals while the first to third scan signals are supplied to first to third scan lines of the second and third display areas.

In an embodiment, the touch driver circuit generates the touch driving signal so that a pulse width of the touch driving signal generated while images are displayed on the second and third display areas is smaller than a pulse width of the touch driving signal generated while images are displayed on the first display area, and wherein the touch driver circuit supplies the touch driving signal so that a falling edge of the touch driving signal is overlapped with a supply period of one of the first to third scan signals while the first to third scan signals are supplied to first to third scan lines of the second and third display areas.

In an embodiment, wherein the touch driver circuit generates and delays the touch driving signal by a predetermined delay period while the first to third scan signals are sequentially supplied to first to third scan lines of the second and third display areas, and wherein the touch driver circuit supplies the touch driving signal to the touch electrodes so that a falling edge of the touch driving signal is overlapped with a supply period of one of the first to third scan signals while the first to third scan signals are supplied to first to third scan lines of the second and third display areas.

In an embodiment, wherein the touch driver circuit generates the touch driving signal so that a pulse width of the touch driving signal generated while images are displayed on the first display area is larger than or smaller than a pulse width of the touch driving signal generated while images are displayed on the second and third display areas, and wherein the touch driver circuit outputs the touch driving signal so that a falling edge of the touch driving signal is overlapped with a supply period of the scan signals while images are displayed on the first display area.

According to embodiments of the present disclosure, it is possible to reduce a difference between the load connected to scan lines around a notch area and the load connected to scan lines in the entire display area of a display device by adjusting the pulse width or supply timing of the scan signals supplied to the scan lines around the notch area. In this manner, it is possible to prevent a difference in luminance between the notch area and the entire display area.

In addition, according embodiments of the present disclosure, it is possible to reduce the influence on the pixels around the notch area by other driving signals such as a touch driving signal while the data lines of the pixels around the notch area are floating. Accordingly, it is possible to prevent defects on displayed images around the notch area, such as a luminance difference and a visible horizontal line.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

The present inventive concept will now be described more fully hereinafter with reference to the accompanying drawings, in which preferred embodiments of the inventive concept are shown. This inventive concept may, however, be embodied in different forms and should not be construed as limited to the embodiments set forth herein. Rather, these embodiments are provided so that this disclosure will be thorough and complete, and will filly convey the scope of the inventive concept to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present inventive concept. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, embodiments of the present disclosure will be described with reference to the accompanying drawings.

Figure 1:
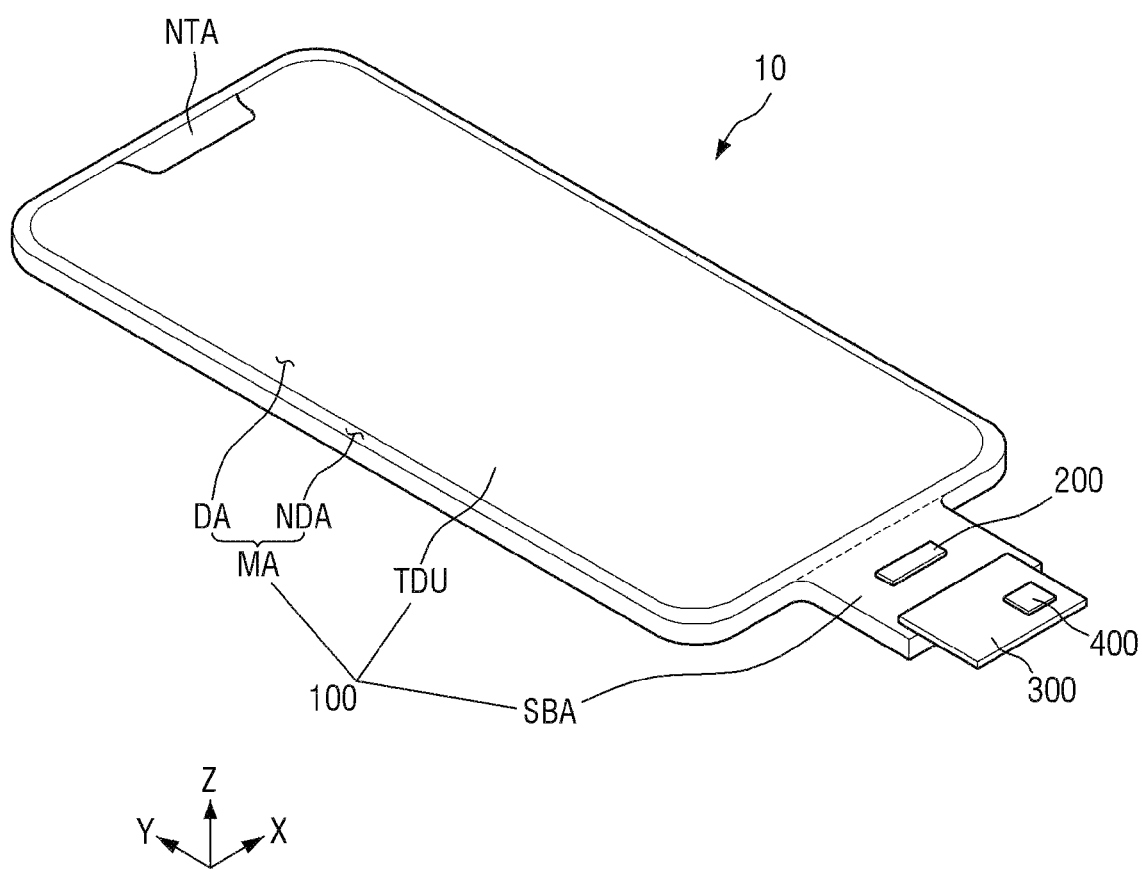
FIG. 1 is a perspective view of a display device according to an embodiment of the present disclosure.
Figure 2:
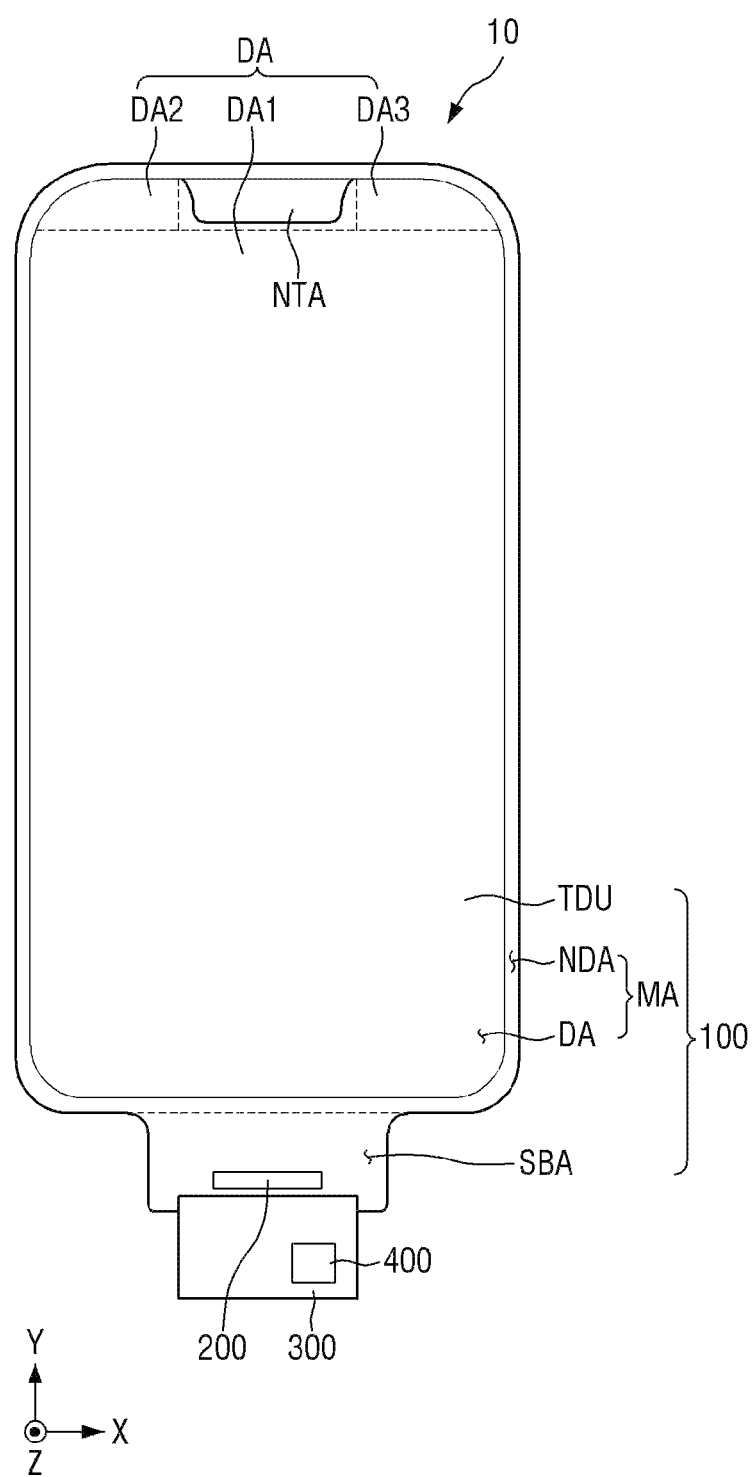
FIG. 2 is a plan view showing a display device according to an embodiment of the present disclosure.
Figure 3:
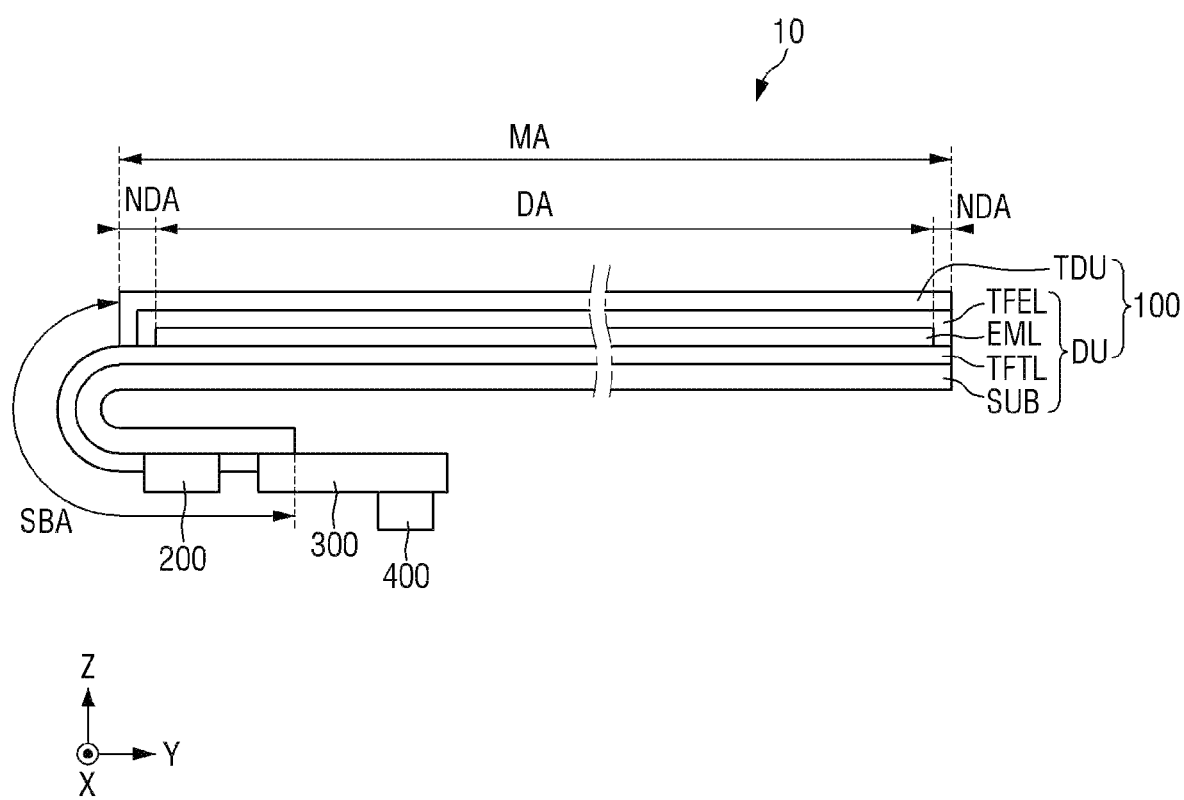
FIG. 3 is a view showing a side of a display device according to an embodiment of the present disclosure.

FIG. 1 is a perspective view of a display device according to an embodiment of the present disclosure. FIG. 2 is a plan view showing a display device according to an embodiment of the present disclosure. FIG. 3 is a view showing a side of a display device according to an embodiment of the present disclosure.

Referring to FIGS. 1 to 3, a display device 10 according to an embodiment of the present disclosure may be employed by portable electronic devices such as a mobile phone, a smart phone, a tablet PC, a mobile communications terminal, an electronic notebook, an electronic book, a portable multimedia player (PMP), a navigation device and a ultra-mobile PC (UMPC). Alternatively, the display device 10 according to an embodiment of the present disclosure may be used as a display device of a television, a laptop computer, a monitor, an electronic billboard, or the Internet of Things (IOT). Alternatively, the display device 10 according to the embodiment of the present disclosure may be applied to wearable devices such as a smart watch, a watch phone, a glasses-type display, and a head-mounted display (HMD) device. Alternatively, the display device 10 according to the embodiment may be used as a center information display (CID) disposed at the instrument cluster, the center fascia or the dashboard of a vehicle, as a room mirror display on the behalf of the side mirrors of a vehicle, as a display placed on the back of each of the front seats that is an entertainment system for passengers at the rear seats of a vehicle.

According to an embodiment of the present disclosure, the display device 10 may be a light-emitting display device such as an organic light-emitting display device using organic light-emitting diodes, a quantum-dot light-emitting display device including quantum-dot light-emitting layer, an inorganic light-emitting display device including an inorganic semiconductor, and a micro-LED display device using micro or nano light-emitting diodes (micro LEDs or nano LEDs). In the following description, an organic light-emitting display device is described as an example of the display device 10 according to the embodiment. It is, however, to be understood that the present disclosure is not limited thereto.

According to the embodiment of the present disclosure, the display device 10 includes a display panel 100, a display driver circuit 200, a display circuit board 300 and a touch driver circuit 400.

The display panel 100 may be formed in a rectangular plane shape having shorter sides in a first direction (x-axis direction) and longer sides in a second direction (y-axis direction) intersecting the first direction (x-axis direction). Each of the corners where the shorter sides in the first direction (x-axis direction) meet the longer sides in the second direction (y-axis direction) may be rounded with a predetermined curvature or may be a right angle. The shape of the display panel 100 when viewed from the top is not limited to a quadrangular shape, but may be formed in a different polygonal shape, a circular shape, or an elliptical shape. The display panel 100 may be formed flat, but the shape of the display panel 100 is not limited thereto. For example, the display panel 100 includes curved portions formed at left and right ends and having a constant curvature or a varying curvature. In addition, the display panel 100 may be a flexible display panel that can be curved, bent, folded or rolled.

The display panel 100 includes a main area MA and a subsidiary area SBA. The main area MA includes a display area DA where images are displayed and a non-display area NDA around the display area DA. The display area DA includes pixels that display images and is an area that displays an image. The non-display area NDA does not include pixels and does not display an image.

The display area DA may include a first display area DA1, a second display area DA2 and a third display area DA3. At least two of the first display area DA1, the second display area DA2 and the third display area DA3 may have different areas. For example, as shown in FIG. 2, the first display area DA1 may be larger than the second display area DA2 and the third display area DA3. At least two of the first display area DA1, the second display area DA2 and the third display area DA3 may have the same area. For example, the second display area DA2 and the third display area DA3 may have the same area. However, the areas of the first display area DA1, the second display area DA2 and the third display area DA3 of the display panel 100 are not limited to those shown in FIG. 1, and for example, the first display area DA1, the second display area DA2 and the third display area DA3 may have different areas.

The first display area DA1 may occupy most of the area of the display panel 100. The first display area DA1 may have a rectangular shape having shorter side in the first direction (x-axis direction) and longer side in the second direction (y-axis direction) when viewed from the top. Corners of the first display area DA1 where the longer side and the shorter side meet may be rounded or formed at a right angle. For example, the upper left corner and the upper right corner of the first display area DA1 may be formed at the right angle, whereas the lower left corner and the lower right corner of the first display area DA1 may be rounded. Alternatively, the first display area DA1 may have a polygonal shape other than a rectangular shape, a circular shape, an oval shape, or an irregular shape when viewed from the top.

The second display area DA2 may be disposed adjacent to one side of the first display area DA1 to protrude from the one side of the first display area DA1 in the second direction (y-axis direction). The lower side of the second display area DA2 may directly contact the upper side of the first display area DA1. The left side of the second display area DA2 may be extended from the left side of the first display area DA1. The second display area DA2 may have an irregular shape.

The maximum length of the second display area DA2 in the first direction (x-axis direction) may be smaller than the maximum length of the first display area DA1 in the first direction (x-axis direction). The maximum length of the second display area DA2 in the second direction (y-axis direction) may be smaller than the maximum length of the first display area DA1 in the second direction (y-axis direction).

The third display area DA3 may be disposed adjacent to the one side of the first display area DA1 to protrude from the one side of the first display area DA1 in the second direction (y-axis direction). The lower side of the third display area DA3 may directly contact the upper side of the first display area DA1. The right side of the third display area DA3 may be extended from the right side of the first display area DA1. The third display area DA3 may have an irregular shape.

The maximum length of the third display area DA3 in the first direction (x-axis direction) may be smaller than the maximum length of the first display area DA1 in the first direction (x-axis direction). The maximum length of the third display area DA3 in the second direction (y-axis direction) may be smaller than the maximum length of the first display area DA1 in the second direction (y-axis direction).

The second display area DA2 may be spaced apart from the third display area DA3 in the first direction (x-axis direction). The second display area DA2 and the third display area DA3 may be symmetrical to each other with respect to the center of the display panel 100 in the second direction (y-axis direction) with a predetermined distance disposed therebetween. Accordingly, a notch area NTA or a cutout portion may be formed between the second display area DA2 and the third display area DA3 of the display panel 100. The notch area NTA may be formed by cutting or removing a part of the display panel 100.

Since the display device 10 includes the notch area NTA formed by cutting or removing a part of the display panel 100, a variety of sensor devices for sensing light may be disposed in the notch area NTA instead of the non-display area of the display device 10. Therefore, the bezel which is a part of the non-display area of the display device 10 can be reduced. Such sensor devices may be sensors that detect light, such as a camera sensor, an illuminance sensor, an infrared sensor, and a proximity sensor.

The subsidiary area SBA may be disposed adjacent to the other side of the first display area DA1, which oppose to the one side of the first display area DA1, to protrude from the other side of the main area MA in the second direction (y-axis direction). Although the subsidiary area SBA is unfolded in the example shown in FIGS. 1 and 2, the subsidiary area SBA may be bent as shown in FIG. 3, in which case it may be disposed on the rear side of the display panel 100. When the subsidiary area SBA is bent, it may overlap with the main area MA in the third direction (z-axis direction), which is the thickness direction of the substrate SUB. The display driver circuit 200 may be disposed in the subsidiary area SBA.

In addition, the display panel 100 includes a substrate SUB, a thin-film transistor layer TFTL, an emission material layer EML, an encapsulation layer TFEL, and a touch detector TDU.

The thin-film transistor layer TFTL may be disposed on the substrate SUB. The thin-film transistor layer TFTL may be disposed in the main area MA and the subsidiary area SBA. The thin-film transistor layer TFTL includes thin-film transistors.

The emission material layer EML may be disposed on the thin-film transistor layer TFTL. The emission material layer EML may be disposed in the display area DA of the main area MA. The emission material layer EML includes light-emitting elements disposed in emission areas.

The encapsulation layer TFEL may be disposed on the emission material layer EML. The encapsulation layer TFEL may be disposed in the display area DA and the non-display area NDA of the main area MA. The encapsulation layer TFEL includes at least one inorganic layer and at least one organic layer for encapsulating the emission material layer.

The touch detector TSU may be formed or disposed on the encapsulation layer TFEL. The touch detector TDU may be formed or disposed on the front surface of the main area MA, i.e., in the display area DA and the non-display area NDA. The touch detector TDU may sense a touch of a person or an object using sensor electrodes.

A cover window for protecting the display panel 100 from impact from above may be disposed on the touch detector TDU. The cover window may be attached on the touch detector TDU by a transparent adhesive such as an optically clear adhesive (OCA) film and an optically clear resin (OCR). The cover window may be an inorganic material such as glass, or an organic material such as plastic and polymer material. In order to prevent deterioration of image visibility due to reflection of external light, a polarizing film may be further disposed between the touch detector TDU and the cover window.

The display driver circuit 200 may generate signals and voltages for driving the display panel 100. The display driver circuit 200 may be implemented as an integrated circuit (IC) and may be attached to the display panel 10 by a chip on glass (COG) technique, a chip on plastic (COP) technique, or an ultrasonic bonding. It is, however, to be understood that the present disclosure is not limited thereto. For example, the display driver circuit 200 may be attached on the display circuit board 300 by the chip-on-film (COF) technique.

The display circuit board 300 may be attached to one end of the subsidiary area SBA of the display panel 100. Accordingly, the display circuit board 300 may be electrically connected to the display panel 100 and the display driver circuit 200. The display panel 100 and the display driver circuit 200 may receive digital video data, timing signals, and driving voltages through the display circuit board 300. The display circuit board 300 may be a flexible printed circuit board, a printed circuit board, or a flexible film such as a chip-on film.

The touch driver circuit 400 may be disposed on the display circuit board 300. The touch driver circuit 400 may be implemented as an integrated circuit (IC) and may be attached on the display circuit board 300.

The touch driver circuit 400 may be electrically connected to the touch electrodes of the touch detector TDU. The touch driver circuit 400 applies touch driving signals to the touch electrodes of the touch detector TDU and measures the amount of change in the mutual capacitance of each of the plurality of touch nodes formed by the touch electrodes. The touch driver circuit 400 may determine whether there is a user's touch or near proximity based on the amount of a change in the mutual capacitance of each of the plurality of touch nodes. A user's touch refers to that an object such as the user's finger or a pen is brought into contact with a surface of the cover window disposed on the touch detector TDU. A user's near proximity refers to that an object such as the user's finger and a pen is hovering over a surface of the cover window.

As shown in FIGS. 1 to 3, in order to reduce reflection of external light by metal lines and metal electrodes of the display panel 100, the display panel 100 includes a color filter layer CFL including color filters. Accordingly, since it is not necessary to attach a separate anti-reflection member such as a polarizing plate on the display panel 100, the fabrication cost of the display device 10 can be saved. In addition, by employing the color filter layer CFL instead of the polarizing plate, it is possible to increase the luminance of the emitted light and the emission efficiency.

Figure 4:
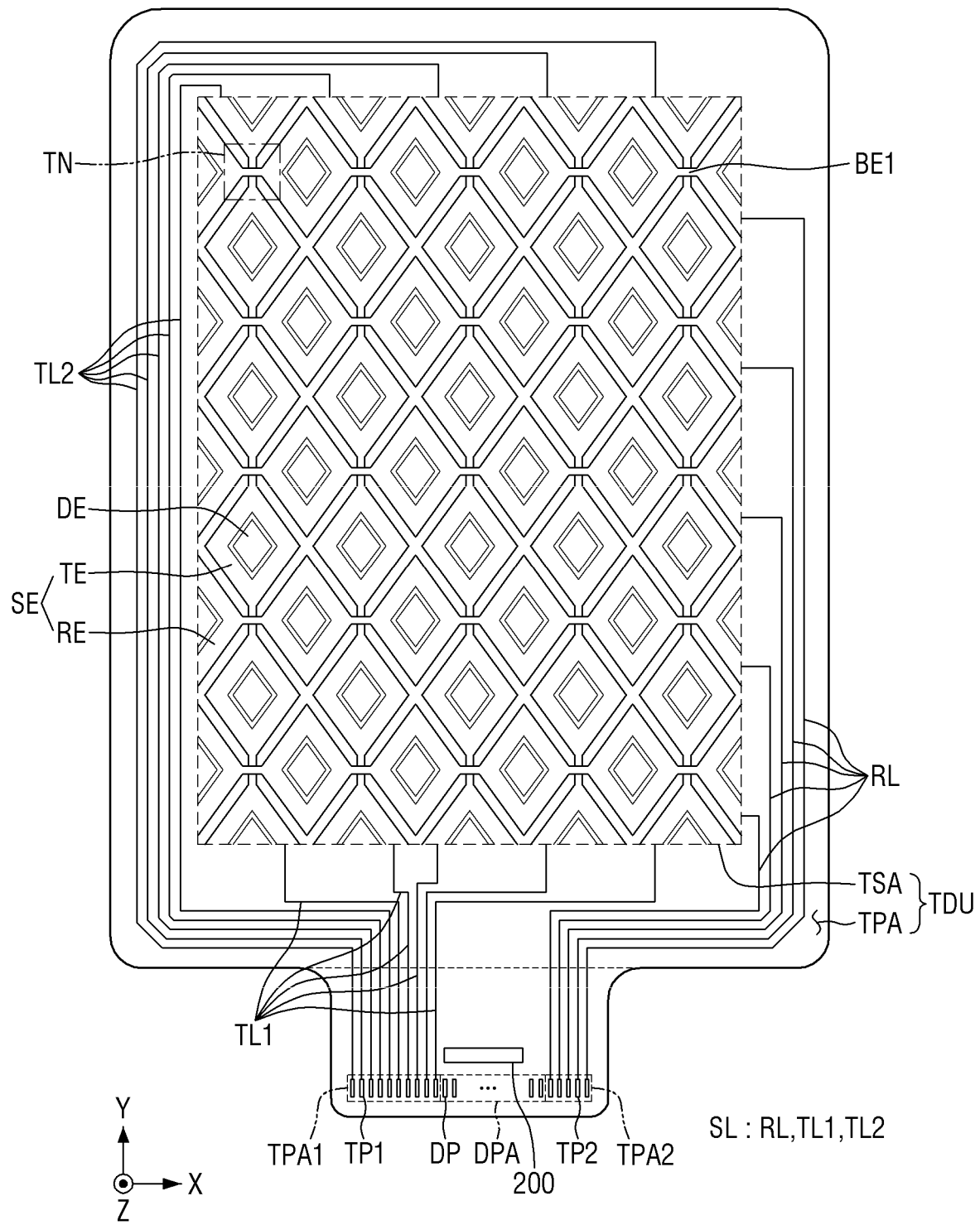
FIG. 4 is a layout diagram schematically showing an example of the touch detector of FIG. 3.

FIG. 4 is a layout diagram schematically showing an example of the touch detector of FIG. 3.

In the structure of the touch detector TDU shown in FIG. 4, the touch electrodes SE include two kinds of electrodes, e.g., driving electrodes TE and sensing electrodes RE. The touch detector TDU may be driven by mutual capacitance sensing, i.e., a touch driving signal is applied to the driving electrodes TE, and then the amount of change in the mutual capacitance of each of the touch nodes is sensed through the sensing electrodes RE.

For convenience of illustration, FIG. 4 shows only the driving electrodes TE, the sensing electrodes RE, dummy patterns DE, touch lines TL1, TL2 and RL, and touch pads TP1 and TP2.

The touch detector TDU includes a touch sensing area TSA for sensing a user's touch, and a touch peripheral area TPA disposed around the touch sensing area TSA. The touch sensing area TSA may overlap the display area DA of FIGS. 1 to 3, and the touch peripheral area TPA may overlap the non-display area NDA of FIGS. 1 to 3.

The touch sensing area TSA includes the driving electrodes TE, the sensing electrodes RE and the dummy patterns DE. The driving electrodes TE and the sensing electrodes RE may be electrodes for forming mutual capacitance to sense a touch of an object or a person.

The sensing electrodes RE may be arranged in the first direction (x-axis direction) and second direction (y-axis direction). The sensing electrodes RE may be electrically connected to one another in the first direction (x-axis direction). The sensing electrodes RE may be connected to one another in the first direction (x-axis direction). The sensing electrodes RE adjacent to one another in the second direction (y-axis direction) may be electrically separated from one another. Accordingly, touch nodes TN where mutual capacitance is formed may be disposed at intersections of the driving electrodes TE and the sensing electrodes RE. A plurality of touch nodes TN may correspond to the intersections of the driving electrodes TE and the sensing electrodes RE, respectively.

The driving electrodes TE may be arranged in the first direction (x-axis direction) and second direction (y-axis direction). The driving electrodes TE adjacent to one another in the first direction (x-axis direction) may be electrically separated from one another. The driving electrodes TE may be electrically connected to one another in the second direction (y-axis direction). The driving electrodes TE adjacent to one another in the second direction (y-axis direction) may be connected through connection electrodes BE1 as shown in FIG. 4.

Each of the dummy patterns DE may be surrounded by the driving electrode TE or the sensing electrode RE. Each of the dummy patterns DE may be electrically separated from the driving electrode TE or the sensing electrode RE. Each of the dummy patterns DE may be spaced apart from the driving electrode TE or the sensing electrode RE. Each of the dummy patterns DE may be electrically floating.

In FIG. 4, the driving electrodes TE, the sensing electrodes RE and the dummy patterns DE each have a diamond shape when viewed from the top, but the present disclosure is not limited thereto. For example, each of the driving electrodes TE, the sensing electrodes RE and the dummy patterns DE may have other quadrangular shape than a diamond, other polygonal shapes than a quadrangular shape, a circle or an ellipse when viewed from the top.

The touch line SL may be disposed in the touch peripheral area TPA. The touch line SL includes touch sensing lines RL connected to the sensing electrodes RE, and first touch driving lines TL1 and second touch driving lines TL2 connected to the driving electrodes TE.

The sensing electrodes RE disposed on one side of the touch sensing area TSA may be connected to the touch sensing lines RL, respectively. For example, some of the sensing electrodes RE that are disposed at the right end may be connected to the touch sensing lines RL as shown in FIG. 4. The touch sensing lines RL may be connected to second sensor pads TP2, respectively. Thus, the touch driver circuit 400 may be electrically connected to the sensing electrodes RE.

The driving electrodes TE disposed at one end of the touch sensing area TSA may be connected to the first driving lines TL1, respectively, while the driving electrodes TE disposed at the opposite end of the touch sensing area TSA may be connected to the second driving lines TL2, respectively. For example, some of the driving electrodes TE at the lower end may be connected to the first touch driving line TL1, while some of the driving electrodes TE disposed at the upper end may be connected to the second touch driving line TL2, as shown in FIG. 4. The second touch driving lines TL2 may extend around the left side of the touch sensing area TSA and connected to the driving electrodes TE on the upper side of the touch sensing area TSA.

The first touch driving lines TL1 and the second touch driving lines TL2 may be connected to the first sensor pads TP1, respectively. Thus, the touch driver circuit 400 may be electrically connected to the driving electrodes TE. The driving electrodes TE are connected to the first and second driving lines TL1 and TL2 on both sides of the touch sensing area TSA, and receive the touch driving signals. Therefore, it is possible to prevent a difference between the touch driving signals applied to the driving electrodes TE disposed on the lower side of the touch sensing area TSA and the touch driving signals applied to the driving electrodes TE disposed on the upper side of the touch sensing area TSA which occurs due to the RC delay of the touch driving signals.

On the other hand, the lines connected to the pixels may be electrically affected by touch driving signals that are applied to the first and second touch driving lines TL1 and TL2 and the driving electrodes TE. For example, the data lines and the scan lines connected to the pixels of the display panel 100 may be electrically affected by the touch driving signals in the form of pulses that are applied to the first and second touch driving lines TL1 and TL2 and the driving electrodes TE. The data lines and the scan lines may be affected by the touch driving signals at every time when the touch driving signals are applied to the first and second touch driving lines TL1 and TL2 and the driving electrodes TE. In particular, when the touch driving signals in the form of pulses are applied while the data lines disposed in the first to third display areas DA1 to DA3 are floating, the voltages of the data lines may be changed instantaneously due to coupling capacitance. When this happens, a luminance difference may occur in the pixels affected by the change in the voltage level of the data lines, which may cause display defects such as a visible horizontal line. In this regard, according to the embodiment of the present disclosure, it is possible to prevent defects on the displayed image by varying the timing of supplying the touch driving signals. A technique for varying the timing of supplying touch driving signals will be described in detail later with reference to the accompanying drawings.

A first touch pad area TPA1 in which the first touch pads TP1 are disposed may be arranged on one side of the display pad area DP in which the display pads DPA are disposed. A second touch pad area TPA2 in which the second touch pads TP2 are disposed may be disposed on the opposite side of the display pad area DPA. The display pads DP may be electrically connected to data lines of the display panel 100.

The display pad area DPA, the first touch pad area TPA1 and the second touch pad area TPA2 may correspond to the pads of the display panel 100 connected to the display circuit board 300 shown in FIG. 2. The display circuit board 300 may be disposed on the display pads DP, the first touch pads TP1, and the second touch pads TP2. The display pads DP, the first touch pads TP1 and the second touch pads TP2 may be electrically connected to the display circuit board 300 using a low-resistance, high-reliability material such as an anisotropic conductive film and a SAP. Therefore, the display pads DP, the first touch pads TP1 and the second touch pads TP2 may be electrically connected to the touch driver circuit 400 disposed on the display circuit board 300.

Figure 5:
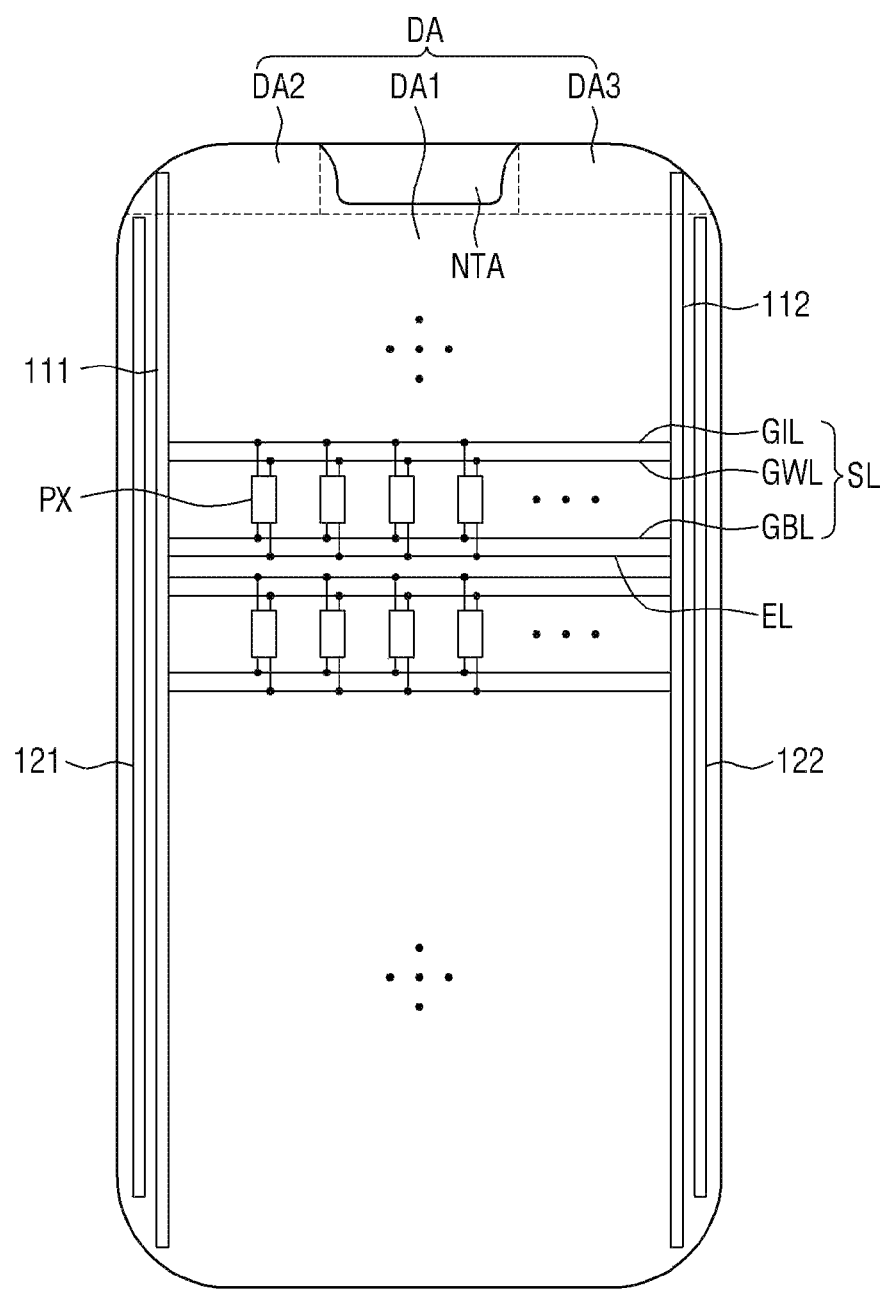
FIG. 5 is a layout diagram showing an example of an arrangement structure of a driver circuit disposed in the first to third display areas and the non-display area of the display panel shown in FIG. 2.

FIG. 5 is a layout diagram showing an example of an arrangement structure of driver circuits disposed in the first to third display areas and the non-display area of the display panel shown in FIG. 2.

Referring to FIG. 5, the display panel 100 includes sub-pixels PX disposed in the first to third display areas DA1 to DA3, first and second scan driver circuits 111 and 112 disposed in the non-display area NDA, and first and second emission driver circuits 121 and 122 disposed in the non-display area NDA. First to third scan lines GIL, GWL and GBL and emission lines EL are disposed in the first to third display areas DA1 to DA3, and the sub-pixels PX are electrically connected to the first to third scan lines GIL, GWL and GBL and the emission lines EL.

One side of the first to third scan lines GIL, GWL and GBL may be connected to the first scan driver circuit 111, and the opposite side thereof may be connected to the second scan driver circuit 112. The first scan line GIL may be an initialization scan line, the second scan line GWL may be a write scan line, and the third scan line GBL may be a bias scan line.

The first and second scan driver circuits 111 and 112 may generate first to third scan signals based on the first to third scan timing signals applied from the display driver circuit 200. In addition, first scan signals may be sequentially supplied to the first scan lines GIL, and second scan signals may be sequentially supplied to the second scan lines GWL. In addition, third scan signals may be supplied to the third scan lines GBL.

The first emission driver circuit 121 may be disposed on the left side of the first scan driver circuit 111 and the second emission driver circuit 122 may be disposed on the right side of the second scan driver circuit 112. One side of the emission lines EL may be connected to the first emission driver circuit 121 and the opposite side of the emission lines EL may be connected to the second emission driver circuit 122. The first and second emission driver circuits 121 and 122 may generate light emission control signals based on emission timing signals applied from the display driver circuit 200 and may sequentially supply the emission control signals to the emission lines EL.

The data lines DL may extend in the second direction (y-axis direction) in the first to third display areas DA1 to DA3 and may be arranged in the first direction (x-axis direction). The data lines DL may cross the first to third scan lines GIL, GWL and GBL.

Each of the sub-pixels PX may emit light for displaying images. The sub-pixels PX may be arranged in a matrix configuration. The sub-pixels PX may be arranged in parallel in the first direction (x-axis direction) and the second direction (y-axis direction). Each of the sub-pixels PX may be connected to the first to third scan lines GIL, GWL and GBL and the data line DL.

Figure 6:
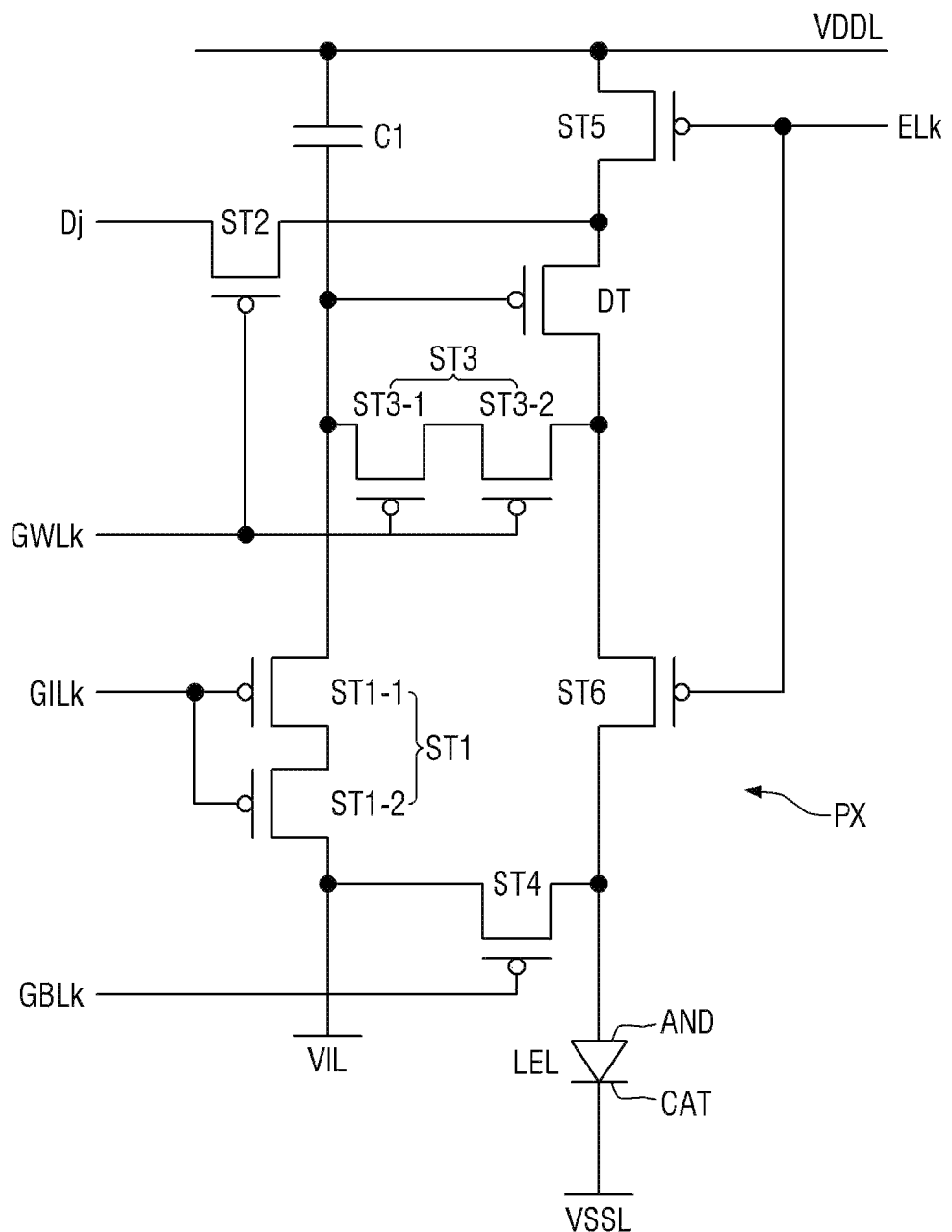
FIG. 6 is a circuit diagram showing an example of one of the sub-pixels shown in FIG. 5.

FIG. 6 is a circuit diagram showing an example of one of the sub-pixels shown in FIG. 5.

Referring to FIG. 6, each of the sub-pixels PX may be connected to the $k^{th}$ first scan line GILk, the $k^{th}$ second scan line GWLk, and the $k^{th}$ third scan line GBLk, where k is a positive integer. In addition, each of the sub-pixels PX may be connected to a first supply voltage line VDDL from which the first supply voltage is applied, an initialization voltage line VIL from which an initializing voltage Vini is applied, and a second supply voltage line VSSL from which the second supply voltage is applied.

Each of the sub-pixels PX includes a driving transistor DT, a light-emitting element LEL, switch elements and a first capacitor C1. The switch elements include first to sixth transistors ST1, ST2, ST3, ST4, ST5 and ST6.

The driving transistor DT may include a gate electrode, a first electrode and a second electrode. The drain-source current Ids (hereinafter referred to as "driving current") of driving transistor DT flowing between the first electrode and the second electrode is controlled according to the data voltage applied to the gate electrode. The driving current Ids flowing through the channel of the driving transistor DT is proportional to the square of the difference between the gate-source voltage Vgs and the threshold voltage of the driving transistor DT, as shown in Equation 1 below:

$$Ids = k' \times (Vgs - Vth)^2 \qquad [\text{Equation 1}]$$

where k' denotes a proportional coefficient determined by the structure and physical properties of the driving transistor, Vgs denotes the gate-source voltage of the driving transistor, and Vth denotes the threshold voltage of the driving transistor.

The light-emitting element LEL emits light as the driving current Ids flows therethrough. The amount of the light emitted from the light-emitting element LEL may be proportional to the driving current Ids.

The light-emitting element LEL may be an organic light-emitting diode including an anode electrode AND, a cathode electrode CAT, and an organic emissive layer disposed between the anode electrode AND and the cathode electrode CAT. Alternatively, the light-emitting element LEL may be an organic light-emitting diode including an anode electrode AND, a cathode electrode CAT, and an inorganic semiconductor disposed between the anode electrode AND and the cathode electrode CAT. Alternatively, the light-emitting element LEL may be a quantum-dot light-emitting diode including an anode electrode AND, a cathode electrode CAT, and a quantum-dot emissive layer disposed between the anode electrode AND and the cathode electrode CAT. Alternatively, the light-emitting element LEL may be a micro light-emitting diode.

The anode electrode AND of the light-emitting element LEL may be connected to the first electrode of the fourth transistor ST4 and the second electrode of the sixth transistor ST6, while the cathode electrode CAT thereof may be connected to the second supply voltage line VSSL. A parasitic capacitance Cel (not shown) may be formed between the anode electrode AND and the cathode electrode CAT of the light-emitting element LEL.

The first transistor ST1 may be implemented as a dual transistor including a (1-1) transistor ST1-1 and a (1-2) transistor ST1-2. The (1-1) transistor ST1-1 and the (1-2) transistor ST1-2 are turned on by the first scan signal of the $k^{th}$ first scan line GILk to connect the gate electrode of the driving transistor DT with the initialization voltage line VIL. The gate electrode of the driving transistor DT may be discharged to the initializing voltage of the initialization voltage line VIL by the (1-1) the transistor ST1-1 and the (1-2) transistor ST1-2 which are turned on. The gate electrode of the (1-1) transistor ST1-1 may be connected to the $k^{th}$ first scan line GILk, the first electrode thereof may be connected to the gate electrode of the driving transistor DT, and the second electrode thereof may be connected to the first electrode of the (1-2) transistor ST1-2. The gate electrode of the (1-2) transistor ST1-2 may be connected to the $k^{th}$ first scan line GILk, the first electrode thereof may be connected to the second electrode of the (1-1) transistor ST1-1, and the second electrode thereof may be connected to the initialization voltage line VIL.

The second transistor ST2 is turned on by the second scan signal of the $k^{th}$ second scan line GWLk to connect the first electrode of the driving transistor DT with the $j^{th}$ data line Dj. The gate electrode of the second transistor ST2 may be connected to the $k^{th}$ second scan line GWLk, the first electrode thereof may be connected to the first electrode of the driving transistor DT, and the second electrode thereof may be connected to the data line Dj.

The third transistor ST3 may be implemented as a dual transistor including a (3-1) transistor ST3-1 and a (3-2) transistor ST3-2. The (3-1) transistor ST3-1 and the (3-2) transistor ST3-2 are turned on by the second scan signal of the $k^{th}$ second scan line GWLk to connect the gate electrode of the driving transistor DT with the second electrode of the driving transistor DT. That is to say, when the (3-1) transistor ST3-1 and the (3-2) transistor ST3-2 are turned on, the gate electrode of the driving transistor DT is connected to the second electrode of the driving transistor DT, and thus the driving transistor DT may be diode-connected. The gate electrode of the (3-1) transistor ST3-1 may be connected to the $k^{th}$ second scan line GWLk, the first electrode thereof may be connected to the second electrode of the (3-2) transistor ST3-2, and the second electrode thereof may be connected to the gate electrode of the driving transistor DT. The gate electrode of the (3-2) transistor ST3-2 may be connected to the $k^{th}$ second scan line GWLk, the first electrode thereof may be connected to the second electrode of the driving transistor DT, and the second electrode thereof may be connected to the first electrode of the (3-1) transistor ST3-1.

The fourth transistor ST4 is turned on by the third scan signal of the $k^{th}$ third scan line GBLk to connect the anode electrode AND of the light-emitting element LEL with the initialization voltage line VIL. The anode electrode AND of the light-emitting element LEL may be discharged to the initializing voltage by the fourth transistor ST4 which is turned on. The gate electrode of the fourth transistor ST4 is connected to the $k^{th}$ third scan line GBLk, the first electrode thereof is connected to the anode electrode AND of the light-emitting element LEL, and the second electrode thereof is connected to the initialization voltage line VIL.

The fifth transistor ST5 is turned on by an emission control signal of the k$^{th}$ emission line ELk to connect the first electrode of the driving transistor DT with the first supply voltage line VDDL. The gate electrode of the fifth transistor ST5 is connected to the k$^{th}$ emission line ELk, the first electrode thereof is connected to the first supply voltage line VDDL, and the second electrode thereof is connected to the first electrode (source electrode) of the drive transistor DT.

The sixth transistor ST6 is connected between the second electrode of the driving transistor DT and the anode electrode of the light-emitting element LEL. The sixth transistor ST6 is turned on by the emission control signal of the k$^{th}$ emission line ELk to connect the second electrode of the driving transistor DT with the anode electrode of the light-emitting element LEL. The gate electrode of the sixth transistor ST6 is connected to the k$^{th}$ emission line ELk, the first electrode thereof is connected to the second electrode of the driving transistor DT, and the second electrode thereof is connected to the anode electrode of the light-emitting element LEL. When the fifth transistor ST5 and the sixth transistor ST6 both are turned on, the driving current Ids can be supplied to the light-emitting element LEL.

The capacitor C1 is formed between the gate electrode of the driving transistor DT and the first supply voltage line VDDL. One electrode of the capacitor C1 may be connected to the gate electrode of the driving transistor DT while the other electrode thereof may be connected to the first supply voltage line VDDL.

When the first electrode of each of the first to sixth transistors ST1, ST2, ST3, ST4, ST5 and ST6 and the driving transistor DT is a source electrode, the second electrode thereof may be a drain electrode. Alternatively, when the first electrode of each of the first to sixth transistors ST1, ST2, ST3, ST4, ST5 and ST6 and the driving transistor DT is a drain electrode, the second electrode thereof may be a source electrode.

The active layer of each of the first to sixth transistors ST1, ST2, ST3, ST4, ST5 and ST6 and the driving transistor DT may be formed of one of poly silicon, amorphous silicon and oxide semiconductor. Although the first to sixth transistors ST1, ST2, ST3, ST4, ST5 and ST6 and the driving transistor DT are implemented as p-type metal oxide semiconductor field effect transistors (MOSFETs) in FIG. 6, this is merely illustrative. They may be implemented as n-type MOSFETs. For example, the first to sixth transistors ST1, ST2, ST3, ST4, ST5 and ST6, and the driving transistor DT may be implemented as n-type MOSFETs.

The first driving voltage from the first supply voltage line VDDL, the second driving voltage from the second supply voltage line VSSL and the initializing voltage from the initializing voltage line Vini may be determined based on the characteristics of the driving transistor DT, the characteristics of the light-emitting element LEL, etc. For example, the voltage difference between the initializing voltage and the data voltage supplied to the source electrode of the driving transistor DT may be set to be smaller than the threshold voltage of the driving transistor DT.

Figure 7:
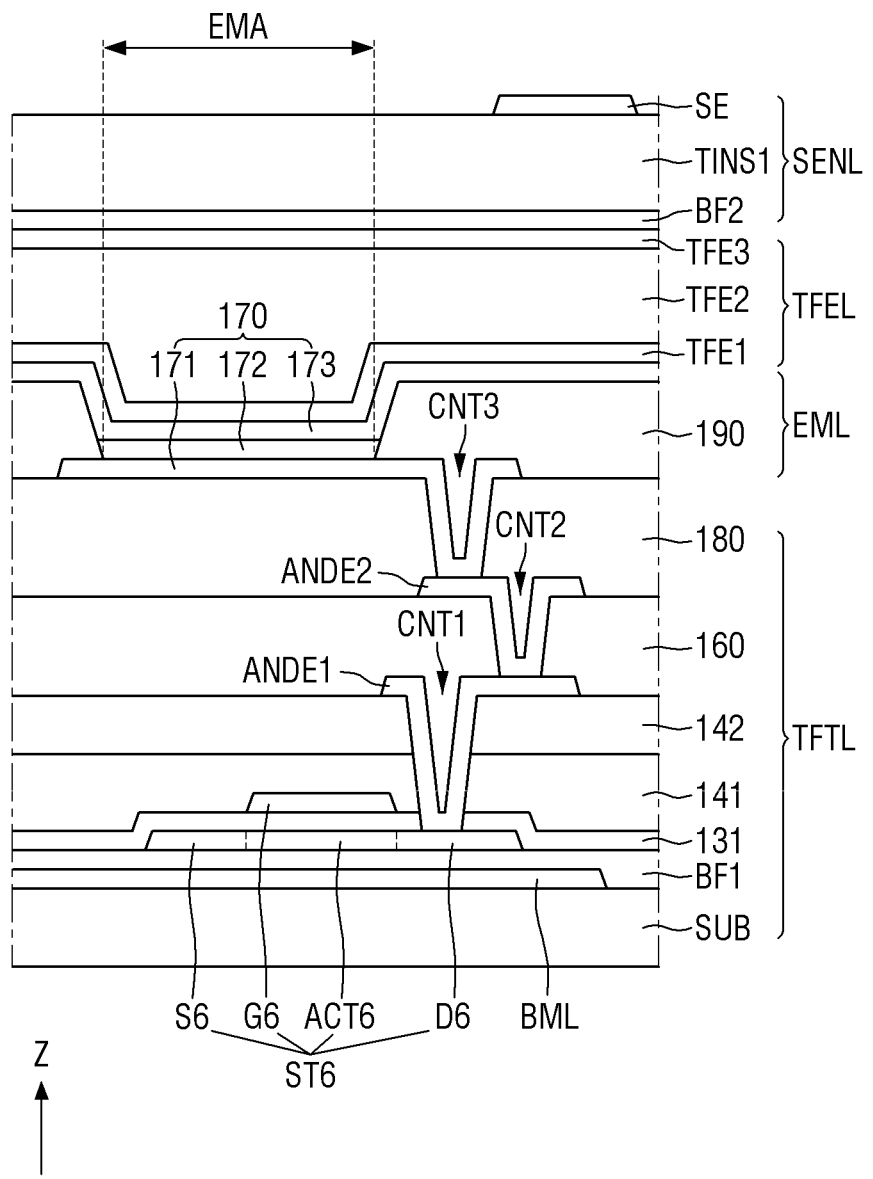
FIG. 7 is a cross-sectional view showing an example of the sixth transistor and the light-emitting element of the sub-pixel shown in FIG. 6.

FIG. 7 is a cross-sectional view showing an example of the sixth transistor and the light-emitting element of the sub-pixel PX shown in FIG. 6. FIG. 7 shows only the sixth transistor among the first to sixth transistors ST1 to ST6 of the sub-pixel PX for convenience of illustration.

Referring to FIG. 7, a first buffer layer BF1 may be disposed on the substrate SUB, and a thin-film transistor layer TFTL, an emission material layer EML, an encapsulation layer TFEL, and a touch electrode layer SENL may be sequentially disposed on the first buffer layer BF1.

The substrate SUB may include an insulating material such as glass, quartz or a polymer resin. For example, the substrate SUB may include polyimide. The substrate SUB may be a flexible substrate that can be bent, folded, or rolled.

The first buffer layer BF1 is a film for protecting the thin-film transistors of a thin-film transistor layer TFTL and an emissive layer 172 of the emission material layer EML. The first buffer layer BF1 may be include inorganic layers sequentially stacked on one another.

A light-blocking layer BML may be disposed on the substrate SUB. The light-blocking layer BML may be disposed so that it overlaps the active layers of the transistors to prevent leakage current when light is incident on the active layers of the transistors. For example, the light-blocking layer BML may overlap an active layer ACT6 of the sixth transistor ST6 in the third direction (z-axis direction) that is the thickness direction of the display panel 100.

The thin-film transistor layer TFTL includes transistors, a gate insulator 131, a first interlayer dielectric layer 141, a second interlayer dielectric layer 142, a first planarization layer 160, and a second planarization layer 180. Each of the thin-film transistors may include an active layer, a gate electrode, a source electrode, and a drain electrode. For example, the sixth transistor ST6 may include an active layer ACT6, a gate electrode G6, a source electrode S6, and a drain electrode D6.

The active layer ACT6, the source electrode S6 and the drain electrode D6 may be formed on the first buffer layer BF1. The active layer ACT6 may include polycrystalline silicon, single crystal silicon, low-temperature polycrystalline silicon, amorphous silicon, or an oxide semiconductor. When the active layer ACT6 includes polycrystalline, the impurity-doped semiconductor layer ACT6 can have conductivity. Therefore, the source electrode S6 and the drain electrode D6 may be formed by doping the active layer ACT6 with impurities.

The gate insulator 131 may be formed on the active layer ACT, the source electrode S, and the drain electrode D. The gate insulator 131 may include an inorganic layer, for example, a silicon nitride layer, a silicon oxynitride layer, a silicon oxide layer, a titanium oxide layer, or an aluminum oxide layer.

The gate electrode G6 may be formed on the gate insulator 131. The gate electrode G6 may include a single layer or multiple layers of one of molybdenum (Mo), aluminum (Al), chromium (Cr), gold (Au), titanium (Ti), nickel (Ni), neodymium (Nd) and copper (Cu) or an alloy thereof.

The first interlayer dielectric layer 141 may be formed on the gate electrode G6. The first interlayer dielectric layer 141 may include an inorganic layer, for example, a silicon nitride layer, a silicon oxynitride layer, a silicon oxide layer, a titanium oxide layer, or an aluminum oxide layer. The first interlayer dielectric layer 141 may include a number of inorganic layers.

A capacitor electrode (not shown) may be disposed on the first interlayer dielectric layer 141. The capacitor electrode may overlap the gate electrode of the driving transistor DT in the third direction (z-axis direction).

The second interlayer dielectric layer 142 may be formed on the first interlayer dielectric layer 141. The second interlayer dielectric layer 142 may include an inorganic layer, for example, a silicon nitride layer, a silicon oxynitride layer, a silicon oxide layer, a titanium oxide layer, or an aluminum oxide layer. The second interlayer dielectric layer 142 may include a number of inorganic layers.

A first anode connection electrode ANDE1 may be disposed on the second interlayer dielectric layer 142. The first anode connection electrode ANDE1 may be connected to the source electrode S6 of the sixth transistor ST6 through a first contact hole CNT1 that is formed through the gate insulator 131, the first interlayer dielectric layer 141 and the second interlayer dielectric layer 142. The first anode connection electrode ANDE1 may include a single layer or multiple layers of one of molybdenum (Mo), aluminum (Al), chromium (Cr), gold (Au), titanium (Ti), nickel (Ni), neodymium (Nd) and copper (Cu) or an alloy thereof.

The first planarization layer 160 may be formed over the first anode connection electrode ANDE1 in order to provide a flat surface over the active layer ACT6, the source electrode S6, the drain electrode D6, the gate electrode G6 and the first anode connection electrode ANDE1 to reduce height differences. The first planarization layer 160 may include an organic layer such as an acryl resin, an epoxy resin, a phenolic resin, a polyamide resin or a polyimide resin.

A protective film (not shown) may be additionally formed between the first anode connection electrode ANDE1 and the first planarization layer 160. The protective film may include an inorganic layer, for example, a silicon nitride layer, a silicon oxynitride layer, a silicon oxide layer, a titanium oxide layer, or an aluminum oxide layer.

A second anode connection electrode ANDE2 may be formed on the first planarization layer 160. The second anode connection electrode ANDE2 may be connected to the first anode connection electrode ANDE1 through a second contact hole CNT2 formed through the first planarization layer 160. The second anode connection electrode ANDE2 may include a single layer or multiple layers of one of molybdenum (Mo), aluminum (Al), chromium (Cr), gold (Au), titanium (Ti), nickel (Ni), neodymium (Nd) and copper (Cu) or an alloy thereof.

A second planarization layer 180 may be formed on the second anode connection electrode ANDE2. The second planarization layer 180 may include an organic layer such as an acryl resin, an epoxy resin, a phenolic resin, a polyamide resin or a polyimide resin.

Although the sixth transistor ST6 is implemented as a top-gate transistor in which the gate electrode G6 is located above the active layer ACT6 in the example shown in FIG. 7, it should be noted that the present disclosure is not limited thereto. That is to say, each of the transistors of the thin-film transistor layer TFTL may be implemented as a bottom-gate transistor or a dual-gate transistor. In a bottom-gate transistor, a gate electrode G may be located below an active layer ACT. In a dual-gate transistor, gate electrodes G may be located above and below an active layer ACT.

The emission material layer EML is formed on the thin-film transistor layer TFTL. The emission material layer EML may include light-emitting elements 170 and a bank 190.

The light-emitting elements 170 and the bank 190 may be formed on a planarization layer 160. Each of the light-emitting elements 170 may include a first light-emitting electrode 171, an emissive layer 172, and a second light-emitting electrode 173. The first light-emitting electrode 171 may be an anode electrode, and the second light-emitting electrode 173 may be a cathode electrode.

The first light-emitting electrode 171 may be formed on the second planarization layer 180. The first light-emitting electrode 171 may be connected to the second anode connection electrode ANDE2 through a third contact hole CNT3 formed through the second planarization layer 180.

In the top-emission organic light-emitting diode that exits light from the emissive layer 172 toward the second light-emitting electrode 173, the first light-emitting electrode 171 may include a metal material having a high reflectivity such as a stack structure of aluminum and titanium (Ti/Al/Ti), a stack structure of aluminum and ITO (ITO/Al/ITO), an APC alloy or a stack structure of APC alloy and ITO (ITO/APC/ITO). The APC alloy is an alloy of silver (Ag), palladium (Pd) and copper (Cu).

The bank 190 may partition the first light-emitting electrode 171 on the second planarization layer 180 to define an emission area EA. The bank 190 may be formed to cover edges of the first light-emitting electrode 171. The bank 190 may include an organic layer such as an acryl resin, an epoxy resin, a phenolic resin, a polyamide resin or a polyimide resin.

In an emission area EMA, the first light-emitting electrode 171, the emissive layer 172 and the second light-emitting electrode 173 are sequentially stacked on one another, so that holes from the first light-emitting electrode 171 and electrons from the second light-emitting electrode 173 are combined with each other in the emissive layer 172 to emit light.

The emissive layer 172 is formed on the first light-emitting electrode 171 and the bank 190. The emissive layer 172 may include an organic material to emit light of a certain color. For example, the emissive layer 172 may include a hole transporting layer, an organic material layer, and an electron transporting layer.

The second light-emitting electrode 173 is formed on the emissive layer 172. The second light-emitting electrode 173 may be formed to cover the emissive layer 172. The second light-emitting electrode 173 may be a common layer formed across the sub-pixels. A capping layer (not shown) may be formed on the second light-emitting electrode 173.

In the top-emission organic light-emitting diode, the second light-emitting electrode 173 may include a transparent conductive material (TCP) such as ITO or IZO that can transmit light, or a semi-transmissive conductive material such as magnesium (Mg), silver (Ag) and an alloy of magnesium (Mg) or silver (Ag). When the second light-emitting electrode 173 is formed of a semi-transmissive conductive material, the light extraction efficiency can be increased by using microcavities.

The encapsulation layer TFEL may be formed on the emission material layer EML. The encapsulation layer TFEL may include at least one inorganic layer to prevent permeation of oxygen or moisture into the emission material layer EML. In addition, the encapsulation layer TFEL may include at least one organic layer to protect the emission material layer EML from foreign substances such as dust. For example, the encapsulation layer TFEL may include a first inorganic layer TFE1, an organic layer TFE2 and a second inorganic layer TFE3.

The first inorganic layer TFE1 may be disposed on the second light-emitting electrode 173, the organic layer TFE2 may be disposed on the first inorganic layer TFE1, and the second inorganic layer TFE3 may be disposed on the organic layer TFE2. The first inorganic layer TFE1 and the second inorganic layer TFE3 may include multiple layers in which one or more inorganic layers of a silicon nitride layer, a silicon oxynitride layer, a silicon oxide layer, a titanium oxide layer and an aluminum oxide layer are alternately stacked on one another. The organic layer TFE2 may be a monomer.

The touch electrode layer SENL is disposed on the encapsulation layer TFEL. The touch electrode layer SENL includes a second buffer layer BF2, touch electrodes SE and a first touch insulating layer TINS1.

A second buffer layer BF2 may be disposed on the encapsulation layer TFEL. The second buffer layer BF2 may include at least one inorganic layer. For example, the second buffer layer BF2 may include multiple layers in which one or more inorganic layers of a silicon nitride layer, a silicon oxynitride layer, a silicon oxide layer, a titanium oxide layer and an aluminum oxide layer are alternately stacked on one another. The second buffer layer BF2 may be omitted.

The first touch insulating layer TINS1 may be disposed on the second buffer layer BF2. The first touch insulating layer TINS1 may include an inorganic layer, for example, a silicon nitride layer, a silicon oxynitride layer, a silicon oxide layer, a titanium oxide layer, or an aluminum oxide layer. Alternatively, the first touch insulating layer TINS1 may include an organic layer, e.g., an acryl resin, an epoxy resin, a phenolic resin, a polyamide resin or a polyimide resin.

The touch electrodes SE may be disposed on the first touch insulating layer TINS1. The touch electrodes SE may not overlap the emission area EMA. In other words, the touch electrodes SE may not be disposed in the emission area EMA. The touch electrodes SE may include a single layer of molybdenum (Mo), titanium (Ti), copper (Cu) or aluminum (Al), or may include a stack structure of aluminum and titanium (Ti/Al/Ti), a stack structure of aluminum and ITO (ITO/Al/ITO), an APC alloy and a stack structure of an APC alloy or ITO (ITO/APC/ITO).

As described above, the first and second touch driving lines TL1 and TL2 and the touch electrodes SE do not overlap the emission area EMA, but may overlap some of the data lines, the first to third scan lines GIL, GWL and GBL and the emission line ELk.

Accordingly, the data lines connected to the sub-pixels of the display panel 100 may be electrically affected by touch driving signals in the form of pulses which are applied to the driving electrodes TE of the touch electrodes SE. When the touch driving signals in the form of pulses are applied to the driving electrodes TE while the data lines disposed in the first to third display areas DA1 to DA3 are floating, the voltages of the data lines may be changed instantaneously due to the coupling capacitance. Accordingly, it is necessary to prevent defects on the displayed image by varying the timing of supplying the touch driving signals.

Figure 8:
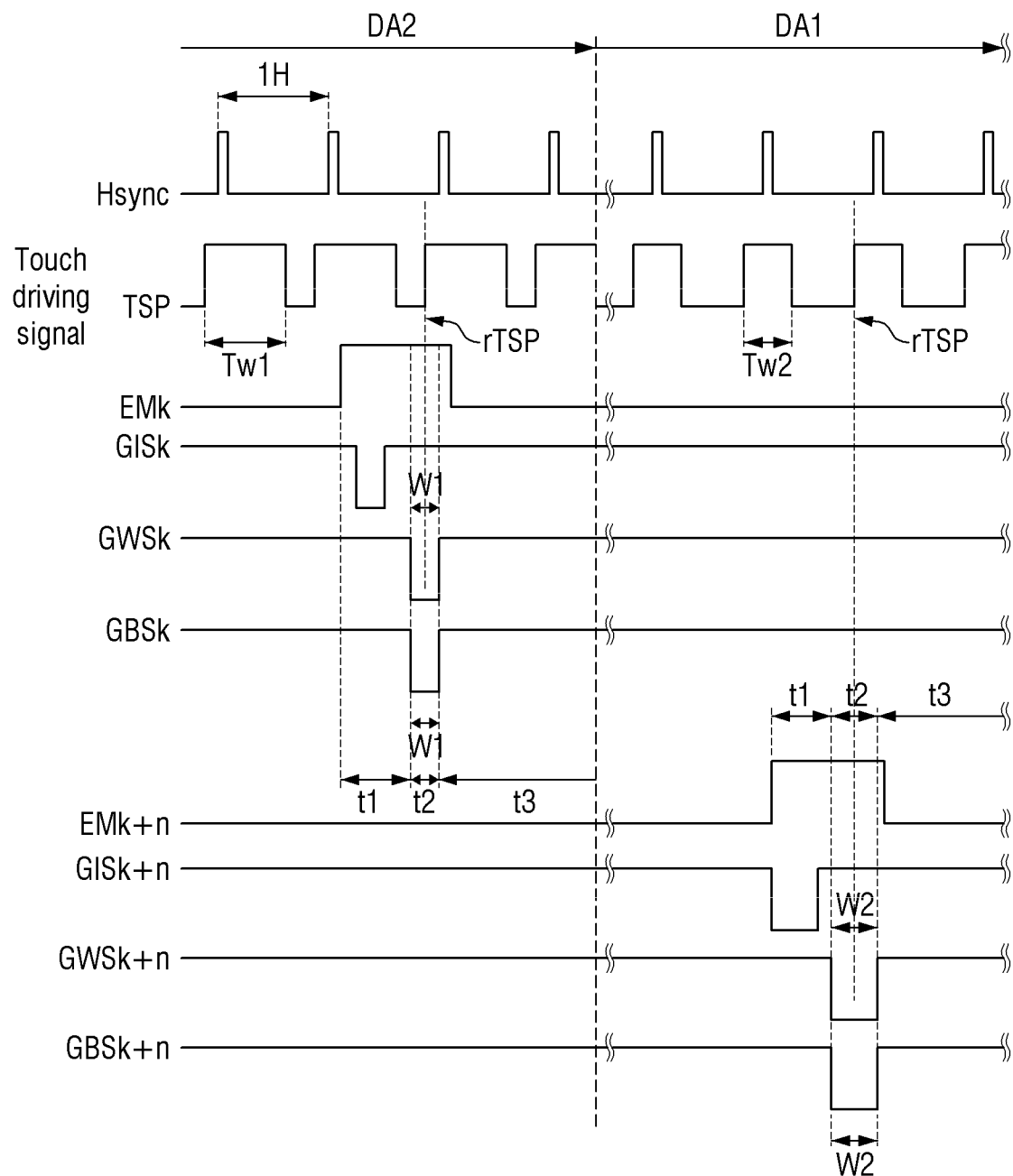
FIG. 8 is a waveform diagram showing a horizontal synchronization signal, a touch driving signal, scan signals, and emission signals according to an embodiment.

FIG. 8 is a waveform diagram showing a horizontal synchronization signal, a touch driving signal, scan signals, and emission signals according to an embodiment.

FIG. 8 shows a horizontal synchronization signal Hsync defining a pixel row driving period for each horizontal line (or horizontal row), and touch driving signal TSP applied to driving electrodes TE of a touch electrode SE in the form of pulses at least horizontal-line by horizontal-line.

In addition, FIG. 8 shows signals applied to sub-pixels of the second and third display areas DA2 and DA3 during a period in which the sub-pixels of the second and third display areas DA2 and DA3 on the both sides of the notch area NTA display images pixel-row by pixel-row. Specifically, a first scan signal GISk applied to the $k^{th}$ first scan line GILk, a second scan signal GWSk applied to the $k^{th}$ second scan line GWLk, a third scan signal GBSk applied to the $k^{th}$ third scan line GBLk, and an emission control signal EMk applied to the $k^{th}$ emission line EL, which are disposed in at least one of the second and third display areas DA2 and DA3 on the both sides of the notch area NTA.

In addition, FIG. 8 also shows signals applied to the sub-pixels in the first display area DA1 while the sub-pixels in the first display area DA1 display images pixel-row by pixel-row after the sub-pixels of the second and third display areas DA2 and DA3 sequentially display image pixel-row by pixel-row. Specifically, FIG. 8 shows a first scan signal GIS(k+1) applied to the $(k+n)^{th}$ first scan line, a second scan signal GWS(k+n) applied to the $(k+n)^{th}$ second scan line, a third scan signal GBS(k+n) applied to the $(k+n)^{th}$ third scan line, and the $(k+n)^{th}$ emission control signal EM(k+n) applied to the $(k+n)^{th}$ emission line, which are disposed in the first display area DA1.

As shown in FIG. 8, during a period in which images are displayed on at least one side area of the notch area NTA (i.e., at least one of the second and third display areas DA2 and DA3), the touch driving signal TSP may be applied to the driving electrodes TE of the touch electrode SE in the form of pulses at least horizontal-line by horizontal-line. To this end, the touch driver circuit 400 may generate a touch driving signal TSP in the form of pulses which swings at least every horizontal line driving period, and may supply it to the driving electrodes TE at least every horizontal line driving period. Accordingly, the pulse width Tw1 of the touch driving signal TSP may be smaller than one horizontal period 1H which is a period between adjacent horizontal synchronization signals Hsync.

The touch driver circuit 400 may generate the touch driving signal TSP so that it is overlapped with the supply period t2 of at least one scan signal among the first to third scan signals GISk, GWSk and GBSk supplied to the sub-pixels PX of the second and third display area DA2 and DA3 while images are displayed on the second and third display area DA2 and DA3, and may supply it to the driving electrodes TE. For example, the touch driver circuit 400 may generate the touch driving signal TSP so that a rising edge rTSP of the touch driving signal TSP is overlapped with the supply period t2 of at least one scan signal among the first to third scan signals GISk, GWSk and GBSk supplied to the sub-pixels PX of the second and third display area DA2 and DA3 and may supply it to the driving electrodes TE. Accordingly, the rising edge rTSP of the touch driving signal TSP may be overlapped with the supply period t2 of at least one of the first to third scan signals GISk, GWSk and GBSk.

Specifically, as shown in FIG. 8, the touch driver circuit 400 may generate the touch driving signal TSP so that it is overlapped with the supply period t2 of the second scan signal GWSk supplied to the sub-pixels PX of the second and third display area DA2 and DA3 while images are displayed on the second and third display area DA2 and DA3, and may supply it to the driving electrodes TE. For example, the touch driver circuit 400 may generate the touch driving signal TSP so that the rising edge rTSP of the touch driving signal TSP is overlapped with the supply period t2 of the second scan signal GWSk supplied to the sub-pixels PX of the second and third display area DA2 and DA3 and may supply it to the driving electrodes TE. Accordingly, the rising edge rTSP of the touch driving signal TSP can be overlapped with the supply period t2 of the second scan signal GWSk.

As such, as the rising edge rTSP of the touch driving signal TSP is overlapped with the supply period t2 of the second scan signal GWSk, it is possible to prevent that the touch driving signal TSP is supplied to the driving electrodes TE when the data lines DL of the sub-pixels PX are floating. For example, if the touch driving signal TSP is supplied to the driving electrodes TE while the data lines DL of the sub-pixels PX are floating, the gate-source voltage Vgs of the driving transistor DT may be affected by the touch driving signal TSP and thus may be varied. Accordingly, as the rising edge rTSP of the touch driving signal TSP is overlapped with the supply period t2 of the second scan signal GWSk, it is possible to prevent that the touch driving signal TSP is supplied to the driving electrodes TE when the data lines DL of the sub-pixels PX are floating.

As described above, the load connected to the sub-pixels PX of the second and third display areas DA2 and DA3 on the both sides of the notch area NTA may be different from the load connected to the sub-pixels PX of the first display area DA. Accordingly, the pulse width w1 of first to third scan signals GISk, GWSk and GBSk applied to the sub-pixels PX of the second and third display areas DA2 and DA3 may be different from the pulse width w2 of first to third scan signals GIS(k+n), GWS(k+n) and GBS(k+n) applied to the sub-pixels PX of the first display area DA1.

For example, the load connected to the sub-pixels PX of the second and third display areas DA2 and DA3 on the both sides of the notch area NTA may be smaller than the load connected to the sub-pixels PX of the first display area DA. Accordingly, the pulse width w1 of first to third scan signals GISk, GWSk and GBSk applied to the sub-pixels PX of the second and third display areas DA2 and DA3 may be smaller than the pulse width w2 of first to third scan signals GIS(k+n), GWS(k+n) and GBS(k+n) applied to the sub-pixels PX of the first display area DA1. In this instance, the touch driver circuit 400 may generate the touch driving signal TSP so that the pulse width Tw1 of the touch driving signal TSP generated while images are displayed on the second and third display areas DA2 and DA3 is larger than the pulse width Tw2 of the touch driving signal TSP generated while images are displayed on the first display area DA1. The touch driver circuit 400 may supply the touch driving signals TSP to the driving electrodes TE so that the rising edge rTSP is overlapped with the supply period t2 of the second scan signal GWSk supplied to the sub-pixels PX of the second and third display area DA2 and DA3. Specifically, the touch driver circuit 400 may generate the touch driving signal TSP so that the rising edge rTSP of the touch driving signal TSP is overlapped with the supply period t2 of the second scan signal GWSk supplied to the sub-pixels PX of the second and third display area DA2 and DA3.

Figure 9:
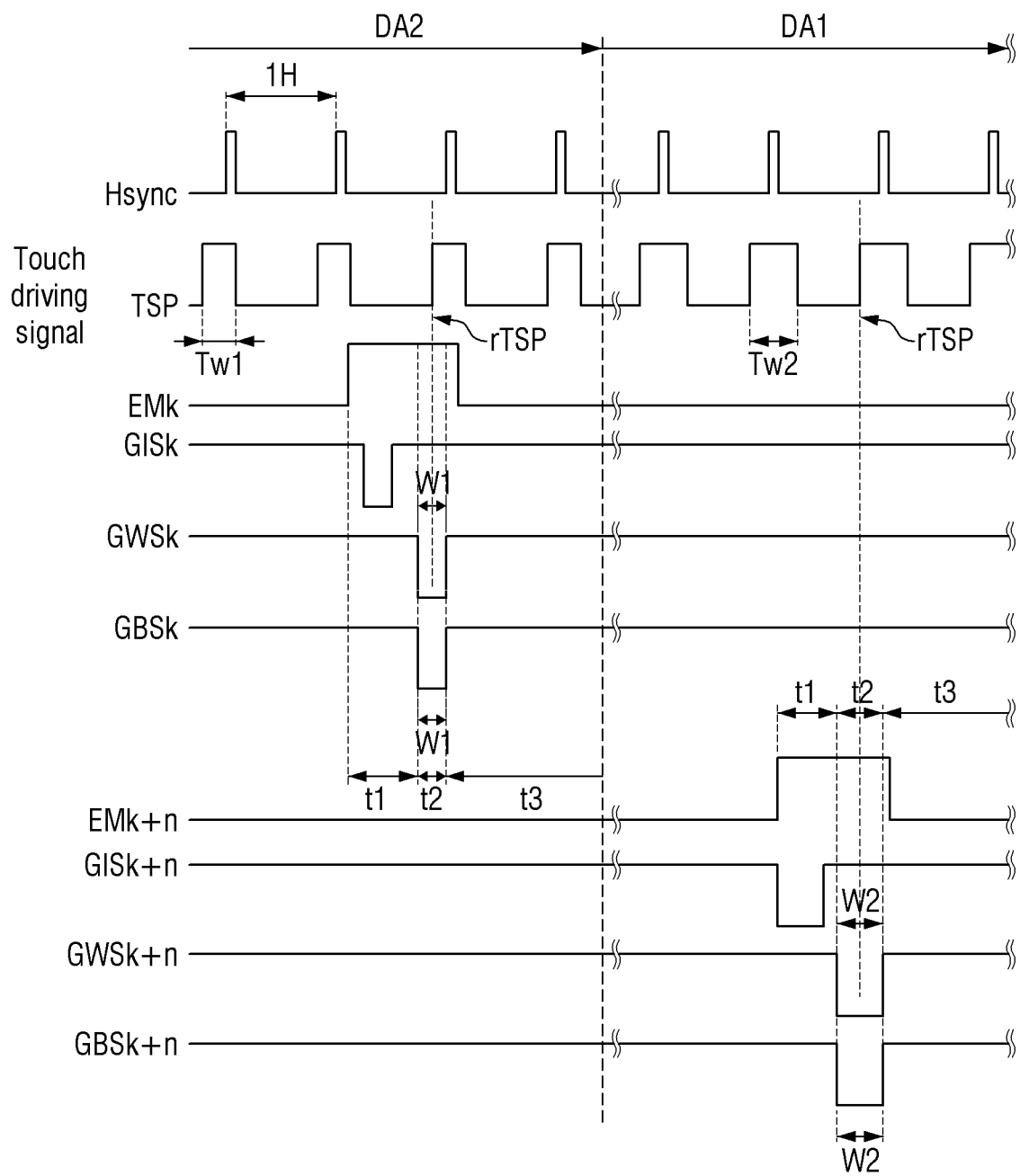
FIG. 9 is another waveform diagram showing a horizontal synchronization signal, a touch driving signal, scan signals, and emission signals according to another embodiment.

FIG. 9 is another waveform diagram showing a horizontal synchronization signal, a touch driving signal, scan signals, and emission signals according to another embodiment.

Referring to FIG. 9, the pulse width w1 of first to third scan signals GISk, GWSk and GBSk applied to the sub-pixels PX of the second and third display areas DA2 and DA3 may be different from the pulse width w2 of first to third scan signals GIS(k+n), GWS(k+n) and GBS(k+n) applied to the sub-pixels PX of the first display area DA1.

The load connected to the sub-pixels PX of the second and third display areas DA2 and DA3 may be smaller than the load connected to the sub-pixels PX of the first display area DA. Accordingly, the pulse width w1 of first to third scan signals GISk, GWSk and GBSk applied to the sub-pixels PX of the second and third display areas DA2 and DA3 may be smaller than the pulse width w2 of first to third scan signals GIS(k+n), GWS(k+n) and GBS(k+n) applied to the sub-pixels PX of the first display area DA1. In this instance, the touch driver circuit 400 may generate the touch driving signals TSP so that the pulse width Tw1 of the touch driving signal TSP generated while images are displayed on the second and third display areas DA2 and DA3 is smaller than the pulse width Tw2 of the touch driving signal TSP generated while images are displayed on the first display area By doing so, the touch driver circuit 400 may supply the touch driving signals TSP to the driving electrodes TE so that the touch driving signals TSP is overlapped with the supply period t2 of the second scan signal GWSk supplied to the sub-pixels PX of the second and third display area DA2 and DA3. Specifically, the touch driver circuit 400 may generate the touch driving signal TSP so that the rising edge rTSP of the touch driving signal TSP is overlapped with the supply period t2 of the second scan signal GWSk supplied to the sub-pixels PX of the second and third display area DA2 and DA3.

Alternatively, the touch driver circuit 400 may generate the touch driving signals TSP so that the pulse width Tw1 of the touch driving signal TSP generated while images are displayed on the second and third display areas DA2 and DA3 is larger than the pulse width Tw2 of the touch driving signal TSP generated while images are displayed on the first display area DA1. In this manner, the touch driver circuit 400 may generate the touch driving signal TSP so that the rising edge rTSP of the touch driving signal TSP is overlapped with the supply period of the second scan signal GWS(k+n) while images are displayed on the first display area DA1.

Figure 10:
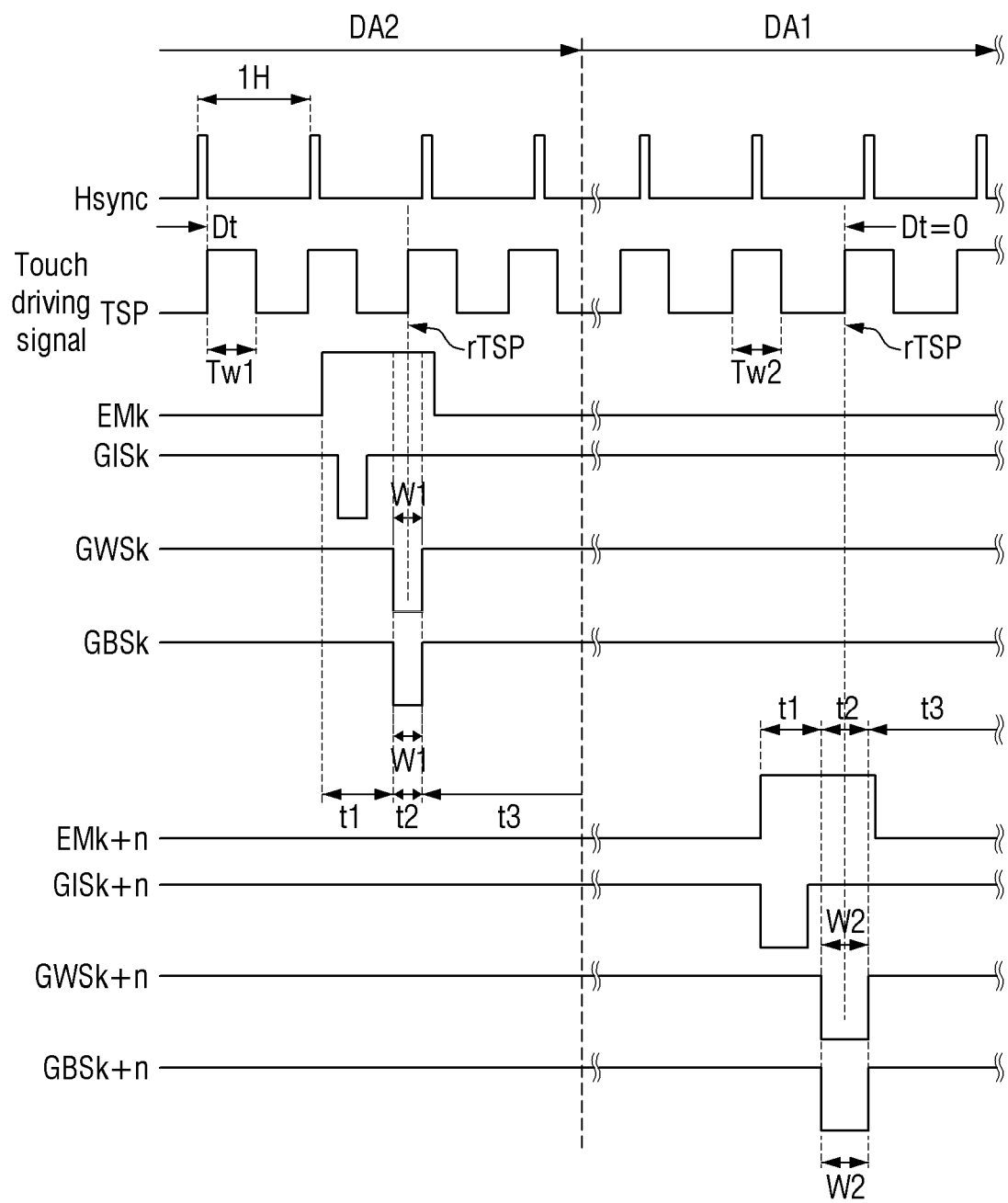
FIG. 10 is yet another waveform diagram showing a horizontal synchronization signal, a touch driving signal, scan signals, and emission signals according to yet another embodiment.

FIG. 10 is yet another waveform diagram showing a horizontal synchronization signal, a touch driving signal, scan signals, and emission signals according to yet another embodiment.

Referring to FIG. 10, a touch driver circuit 400 may generate a touch driving signal TSP so that it is delayed by a predetermined delay period Dt while images are displayed on the second and third display areas DA2 and DA3 and may output it. By doing so, the touch driver circuit 400 may generate the touch driving signals TSP so that it is overlapped with the supply period t2 of the second scan signal GWSk supplied to the sub-pixels PX of the second and third display area DA2 and DA3 and may supply it to the driving electrodes TE. That is to say, the touch driver circuit 400 may delay the generation or output timing of the touch driving signal TSP by the predetermined delay period Dt to output the touch driving signal TSP so that the rising edge rTSP of the touch driving signal TSP is overlapped with the supply period t2 of the second scan signal GWSk supplied to the sub-pixels PX of the second and third display area DA2 and DA3.

Alternatively, the touch driver circuit 400 may generate the touch driving signal TSP every predetermined horizontal period without delaying it while images are displayed on the first display area DA1. In this manner, the touch driver circuit 400 may generate the touch driving signal TSP so that the rising edge rTSP of the touch driving signal TSP is overlapped with the supply period of the second scan signal GWS(k+n) while images are displayed on the first display area DA1.

Figure 11:
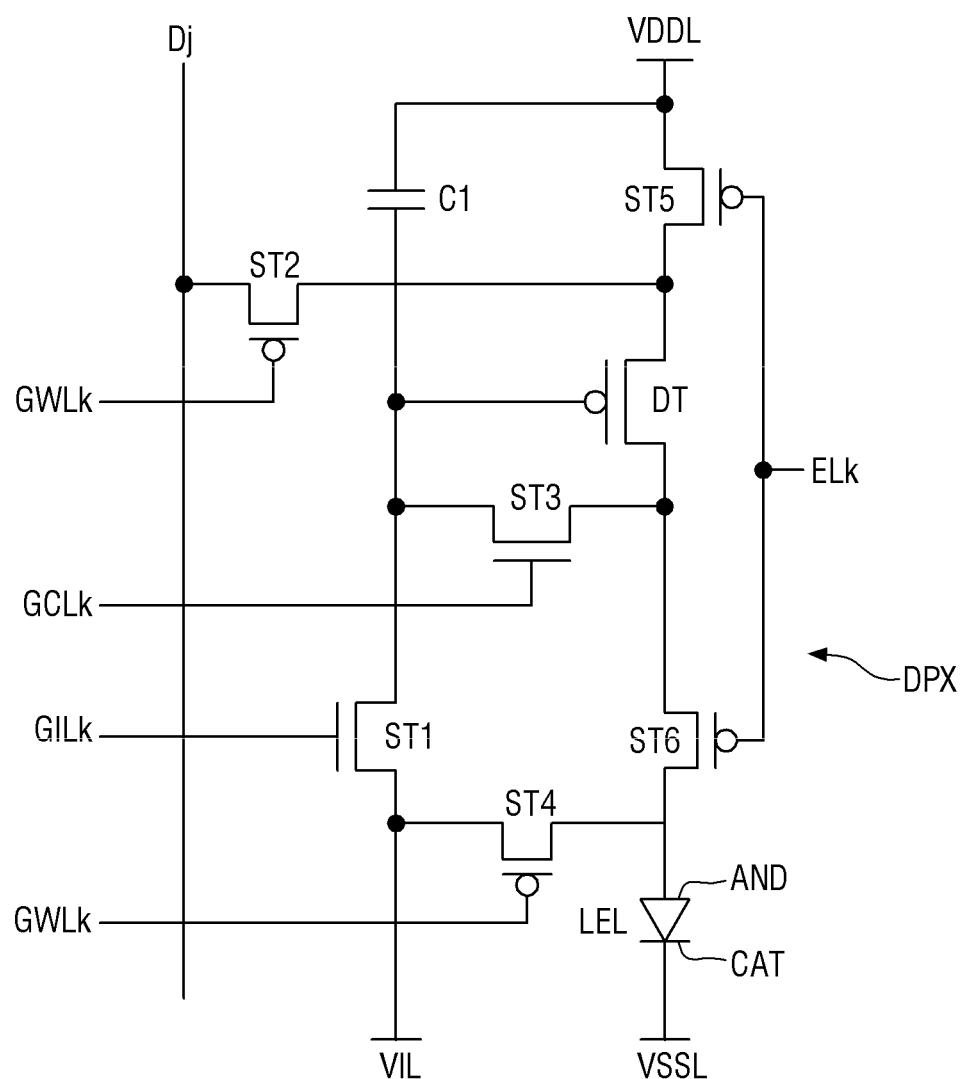
FIG. 11 is a circuit diagram showing another example of one of the sub-pixels shown in FIG. 5.

FIG. 11 is a circuit diagram showing another example of one of the sub-pixels shown in FIG. 5.

The embodiment of FIG. 11 is different from the embodiment of FIG. 6 in that the driving transistor DT, the second transistor ST2, the fourth transistor ST4, the fifth transistor ST5 and the sixth transistor ST6 are implemented as p-type MOSFETs while the first transistor ST1 and the third transistor ST3 are implemented as n-type MOSFETs.

The driving transistor DT, the second transistor ST2, the fourth transistor ST4, the fifth transistor ST5, the sixth transistor ST6 and the capacitor C1 shown in FIG. 11 is substantially identical to the driving transistor DT, the second transistor ST2, the fifth transistor ST5, the sixth transistor ST6 and the capacitor C1 shown in FIG. 6; and, therefore, the redundant descriptions will be omitted.

Referring to FIG. 11, the first transistor ST1 is turned on by the first scan signal of the $k^{th}$ first scan line GILk to connect the gate electrode of the driving transistor DT with the initialization voltage line VIL. The gate electrode of the driving transistor DT may be discharged to the initializing voltage of the initialization voltage line VIL. The gate electrode of the first transistor ST1 may be connected to the first scan line GILk, the first electrode thereof may be connected to the gate electrode of the driving transistor DT, and the second electrode thereof may be connected to the initialization voltage line VIL.

The third transistor ST3 is turned on by a control scan signal of the fourth scan line GCLk to connect the gate electrode and the second electrode of the driving transistor DT. That is to say, when the third transistor ST3 is turned on, the gate electrode of the drive transistor DT is connected to the second electrode of the drive transistor DT, and thus the driving transistor DT may be diode-connected. The gate electrode of the third transistor ST1 may be connected to the fourth scan line GCLk, the first electrode thereof may be connected to the second electrode of the driving transistor DT, and the second electrode thereof may be connected to the gate electrode of the driving transistor DT.

The fourth transistor ST4 is turned on by a write scan signal of a second write scan line GWLk to connect an anode electrode AND of a light-emitting element LEL with the initialization voltage line VIL. The anode electrode AND of the light-emitting element LEL may be discharged to the initializing voltage. The gate electrode of the fourth transistor ST4 is connected to the second write scan line GWLk, the first electrode thereof is connected to the anode electrode AND of the light-emitting element LEL, and the second electrode thereof is connected to the initialization voltage line VIL.

The active layer of each of the driving transistor DT, the second transistor ST2, the fourth transistor ST4, the fifth transistor ST5 and the sixth transistor ST6 implemented as p-type MOSFETs may be made of polysilicon, and the active layer of the first transistor ST1 and the third transistor ST3 implemented as n-type MOSFETs may be made of oxide semiconductor.

Figure 12:
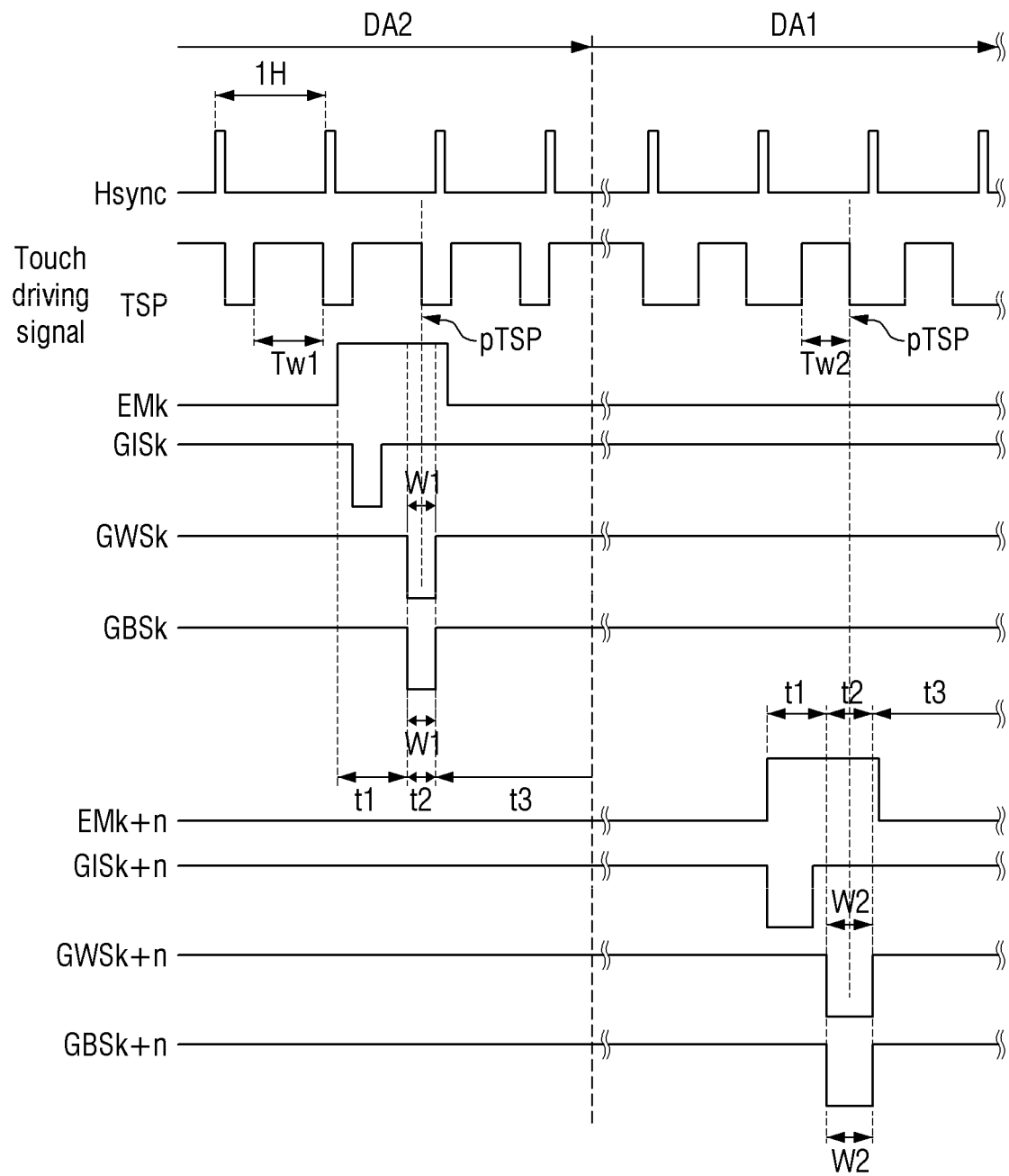
FIG. 12 is another waveform diagram showing a horizontal synchronization signal, a touch driving signal, scan signals, and emission signals according to an embodiment.

FIG. 12 is another waveform diagram showing a horizontal synchronization signal, a touch driving signal, scan signals, and emission signals according to an embodiment.

FIG. 12 shows a horizontal synchronization signal Hsync defining a pixel row driving period for each horizontal line (or horizontal row), and touch driving signal TSP applied to driving electrodes TE of a touch electrode SE in the form of pulses at least horizontal-line by horizontal-line.

In addition, FIG. 12 shows signals applied to pixels of the second and third display areas DA2 and DA3 during a period in which the pixels of the second and third display areas DA2 and DA3 on the both sides of the notch area NTA display images pixel-row by pixel-row. Specifically, a first scan signal GISk applied to the $k^{th}$ first scan line GILk, a second scan signal GWSk applied to the $k^{th}$ second scan line GWLk, a third scan signal GBSk applied to the $k^{th}$ third scan line GBLk, and an emission control signal EMk applied to the $k^{th}$ emission line EL, which are disposed in at least one of the second and third display areas DA2 and DA3 on the both sides of the notch area NTA.

In addition, FIG. 12 also shows signals applied to the pixels in the first display area DA1 while the pixels in the first display area DA1 display images pixel-row by pixel-row after the pixels of the second and third display areas DA2 and DA3 sequentially display image pixel-row by pixel-row. Specifically, FIG. 12 shows a first scan signal GIS(k+n) applied to the $(k+n)^{th}$ first scan line, a second scan signal GWS(k+n) applied to the $(k+n)^{th}$ second scan line, a third scan signal GBS(k+n) applied to the $(k+n)^{th}$ third scan line, and the $(k+n)^{th}$ emission control signal EM(k+n) applied to the $(k+n)^{th}$ emission line, which are disposed in the first display area DA1.

During a period in which images are displayed on at least one side area of the notch area NTA (i.e., at least one of the second and third display areas DA2 and DA3), the touch driving signal TSP may be applied to the driving electrodes TE of the touch electrode SE in the form of pulses at least horizontal-line by horizontal-line. A falling edge pTSP of the touch driving signal TSP applied to the driving electrodes TE may be overlapped with a supply period t2 of at least one of the first to third scan signals GISk, GWSk and GBSk.

To this end, the touch driver circuit 400 may generate a touch driving signal TSP in the form of pulses which swings at least every horizontal line driving period, and may supply it to the driving electrodes TE at least every horizontal line driving period. Accordingly, the pulse width Tw1 of the touch driving signal TSP may be smaller than one horizontal period 1H which is a period between adjacent horizontal synchronization signals Hsync.

Specifically, the touch driver circuit 400 may generate the touch driving signal TSP so that the falling edge pTSP of the touch driving signal TSP is overlapped with the supply period t2 of at least one scan signal among the first to third scan signals GISk, GWSk and GBSk supplied to the sub-pixels PX of the second and third display area DA2 and DA3 and may supply it to the driving electrodes TE. Accordingly, the falling edge pTSP of the touch driving signal TSP may be overlapped with the supply period t2 of at least one of the first to third scan signals GISk, GWSk and GBSk.

For example, the touch driver circuit 400 may generate the touch driving signal TSP so that the falling edge pTSP of the touch driving signal TSP is overlapped with the supply period t2 of the second scan signal GWSk supplied to the sub-pixels PX of the second and third display area DA2 and DA3 and may supply it to the driving electrodes TE. Accordingly, the falling edge pTSP of the touch driving signal TSP can be overlapped with the supply period t2 of the second scan signal GWSk.

As described above, the pulse width w1 of first to third scan signals GISk, GWSk and GBSk applied to the sub-pixels PX of the second and third display areas DA2 and DA3 may be smaller than the pulse width w2 of first to third scan signals GIS(k+n), GWS(k+n) and GBS(k+n) applied to the sub-pixels PX of the first display area DA1.

In this instance, the touch driver circuit 400 may generate the touch driving signal TSP so that the pulse width Tw1 of the touch driving signal TSP generated while images are displayed on the second and third display areas DA2 and DA3 is larger than the pulse width Tw2 of the touch driving signal TSP generated while images are displayed on the first display area DA1. The touch driver circuit 400 may generate the touch driving signal TSP so that the falling edge pTSP of the touch driving signal TSP is overlapped with the supply period t2 of the second scan signal GWSk supplied to the sub-pixels PX of the second and third display area DA2 and DA3.

Figure 13:
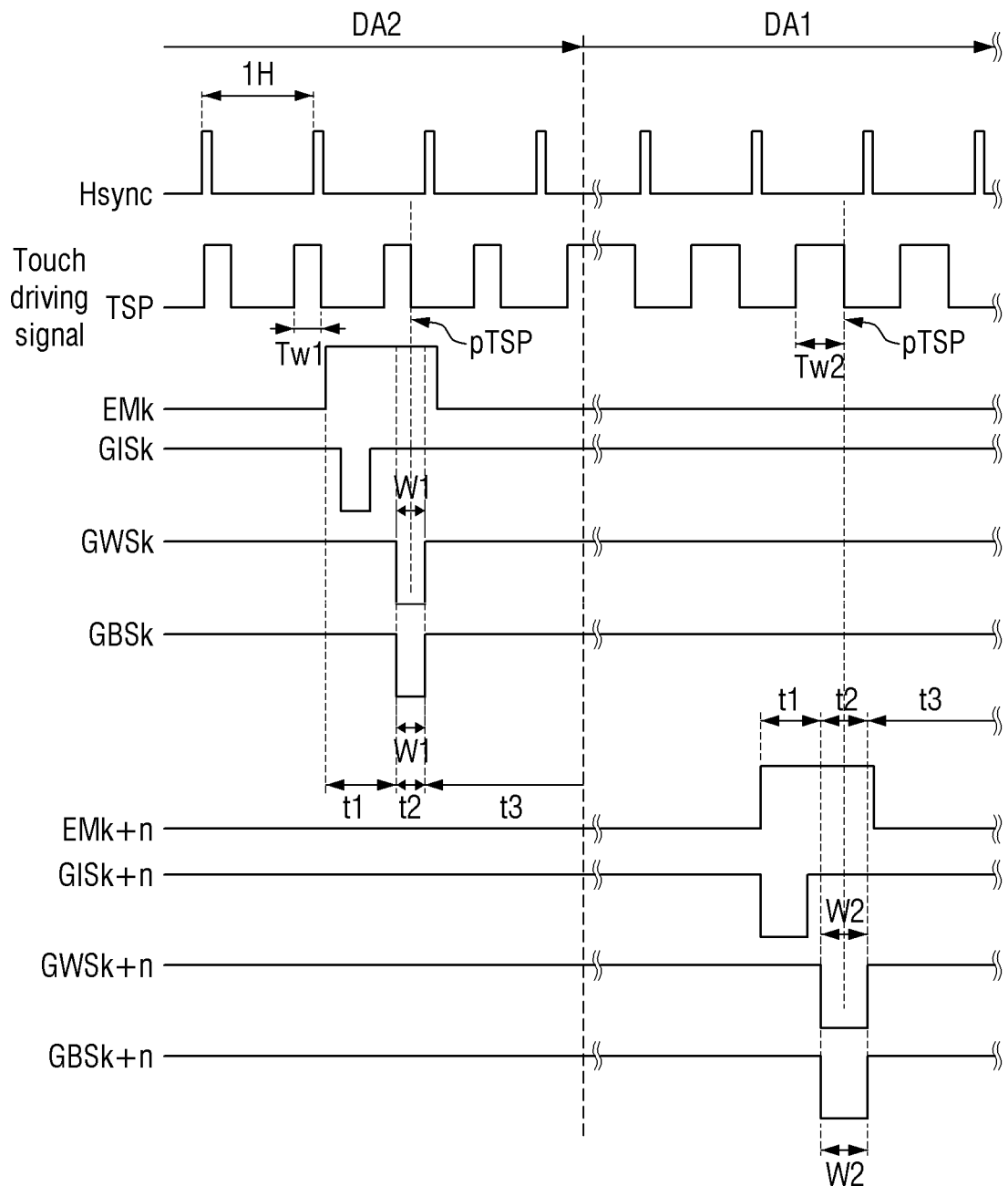
FIG. 13 is yet another waveform diagram showing a horizontal synchronization signal, a touch driving signal, scan signals, and emission signals according to an embodiment.

FIG. 13 is yet another waveform diagram showing a horizontal synchronization signal, a touch driving signal, scan signals, and emission signals according to an embodiment.

Referring to FIG. 13, the pulse width w1 of first to third scan signals GISk, GWSk and GBSk applied to the sub-pixels PX of the second and third display areas DA2 and DA3 may be smaller than the pulse width w2 of first to third scan signals GIS(k+n), GWS(k+n) and GBS(k+n) applied to the sub-pixels PX of the first display area DA1.

The touch driver circuit 400 may generate the touch driving signal TSP so that the pulse width Tw1 of the touch driving signal TSP generated while images are displayed on the second and third display areas DA2 and DA3 is smaller than the pulse width Tw2 of the touch driving signal TSP generated while images are displayed on the first display area DA1. The touch driver circuit 400 may generate the touch driving signal TSP so that the falling edge pTSP of the touch driving signal TSP is overlapped with supply period t2 of the second scan signal GWSk supplied to the sub-pixels PX of the second and third display area DA2 and DA3.

Alternatively, the touch driver circuit 400 may generate the touch driving signal TSP so that the pulse width Tw1 of the touch driving signal TSP generated while images are displayed on the second and third display areas DA2 and DA3 is larger than the pulse width Tw2 of the touch driving signal TSP generated while images are displayed on the first display area DA1. In this manner, the touch driver circuit 400 may generate the touch driving signal TSP so that the falling edge pTSP of the touch driving signal TSP is overlapped with the supply period of the second scan signal GWS(k+n) while images are displayed on the first display area DA1.

Figure 14:
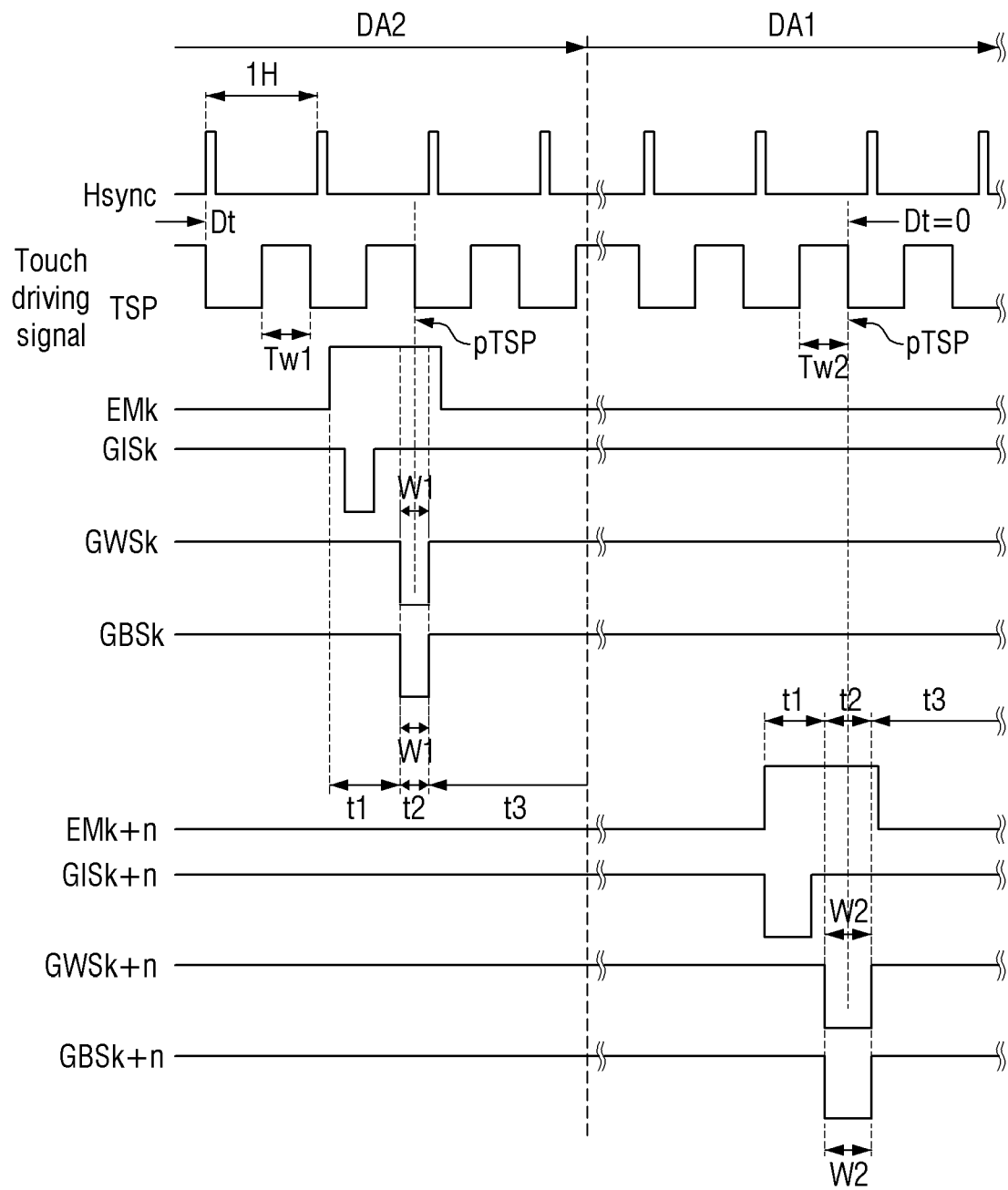
FIG. 14 is a waveform diagram showing a horizontal synchronization signal, a touch driving signal, scan signals, and emission signals according to another embodiment.

FIG. 14 is a waveform diagram showing a horizontal synchronization signal, a touch driving signal, scan signals, and emission signals according to another embodiment.

Referring to FIG. 14, a touch driver circuit 400 may generate a touch driving signal TSP so that it is delayed by a predetermined delay period Dt while images are displayed on the second and third display areas DA2 and DA3 and may output it.

The touch driver circuit 400 may delay the generation or output timing of the touch driving signal TSP by the predetermined delay period Dt to output the touch driving signal TSP so that the falling edge pTSP of the touch driving signal TSP is overlapped with the supply period t2 of the second scan signal GWSk supplied to the sub-pixels PX of the second and third display area DA2 and DA3.

Alternatively, the touch driver circuit 400 may generate the touch driving signal TSP every predetermined horizontal period without delaying it while images are displayed on the first display area DA1. In this manner, the touch driver circuit 400 may generate the touch driving signal TSP so that the falling edge pTSP of the touch driving signal TSP is overlapped with the supply period of the second scan signal GWS(k+n) while images are displayed on the first display area DA1.

Figure 15:
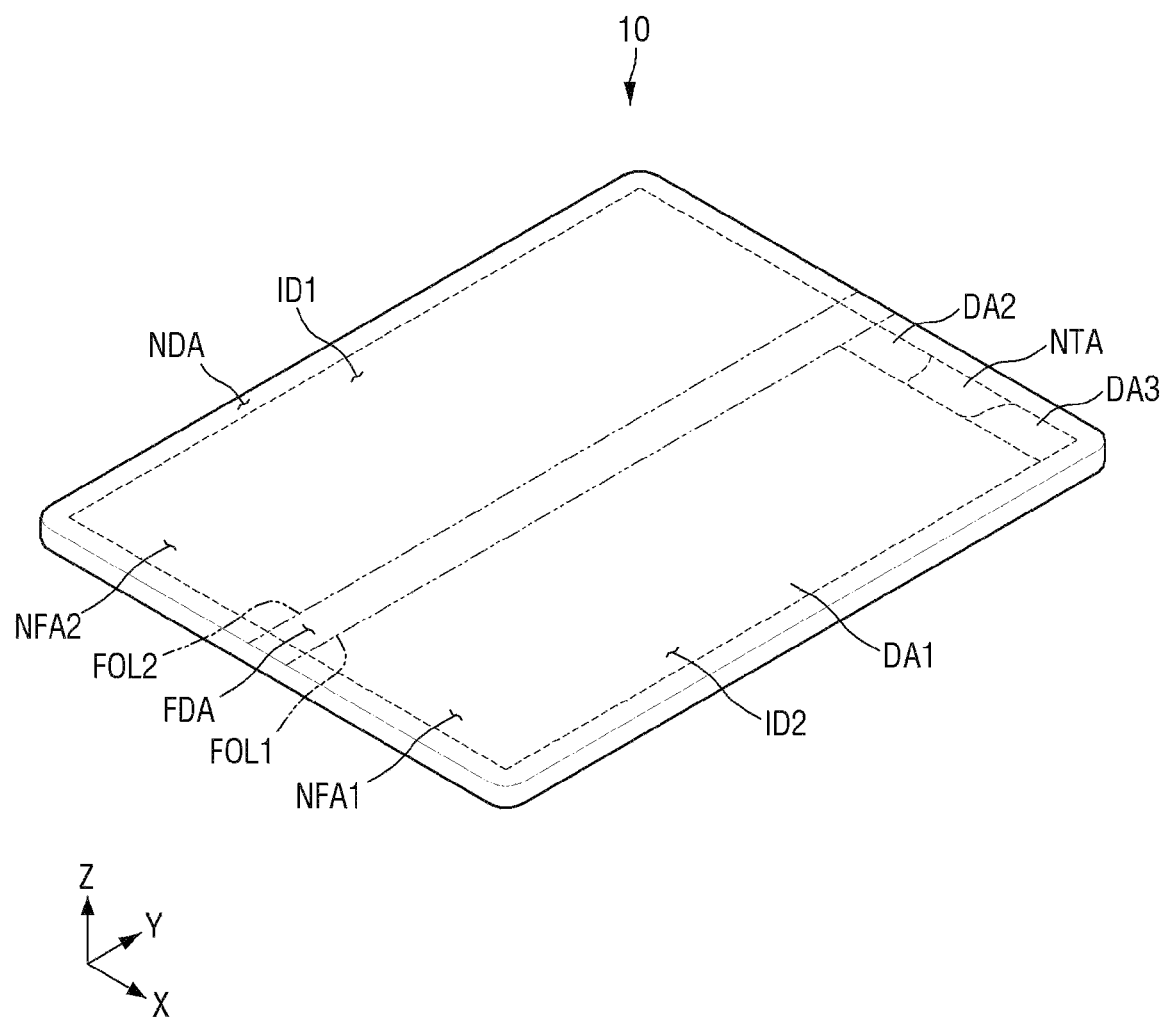
FIGS. 15 and 16 are perspective views showing a display device according to another embodiment.
Figure 16:
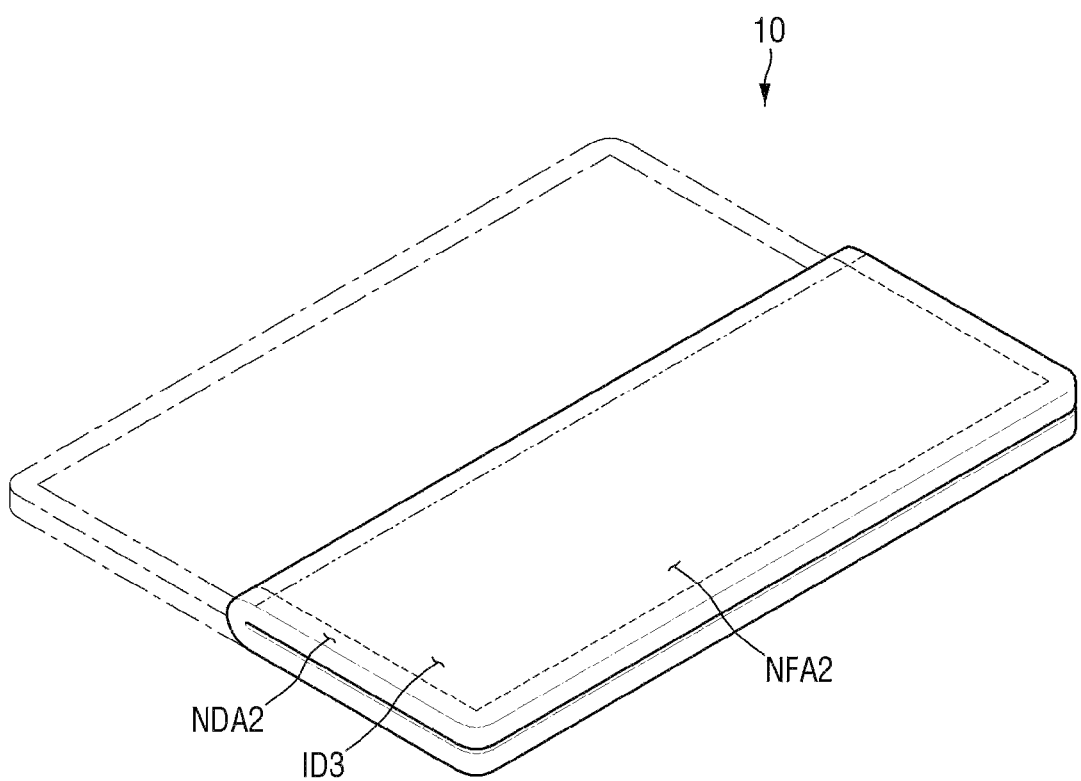

FIGS. 15 and 16 are perspective views showing a display device according to another embodiment.

In the example shown in FIGS. 15 and 16, a display device 10 is a foldable display device that can be folded along the first direction (x-axis direction). The display device 10 may remain folded as well as unfolded. The display device 10 may be folded inward (in-folding manner) such that the front surface is located inside when the display device 10 is folded. When the display device 10 is bent or folded in the in-folding manner, a part of the front surface of the display device 10 may face the other part of the front surface. Alternatively, the display device 10 may be folded outward (out-folding manner) such that the front surface is located outside when the display device 10 is folded. When the display device 10 is bent or folded in the out-folding manner, a part of the rear surface of the display device 10 may face the other part of the rear surface.

The first non-folding area NFA1 may be disposed on one side of the folding area FDA, for example, the right side of the folding area FDA. The second non-folding area NFA2 may be disposed on the opposite side of the first non-folding area NFA1 with respect to the folding area FDA, for example, the left side of the folding area FDA.

The first folding line FOL1 and the second folding line FOL2 may extend along the second direction (y-axis direction), and the display device 10 may be folded along the first direction (x-axis direction). As a result, the length of the display device 10 in the first direction (the x-axis direction) may be reduced to about half, so that a user can carry the display device 10 easily.

The direction in which the first folding line FOL1 and the second folding line FOL2 extend is not limited to the second direction (y-axis direction). For example, the first folding line FOL1 and the second folding line FOL2 may be extended along the first direction (x-axis direction), and the display device 10 may be folded along the second direction (y-axis direction). In such case, the length of the display device 10 in the second direction (y-axis direction) may be reduced to about half. Alternatively, the first folding line FOL1 and the second folding line FOL2 may extend in a diagonal direction of the display device 10 between the first direction (x-axis direction) and the second direction (y-axis direction). In such case, the display device 10 may be folded to have a triangle shape.

When the first folding line FOL1 and the second folding line FOL2 extend along the second direction (y-axis direction), the length of the folding area FDA along the first direction (x-axis direction) may be smaller than the length of the folding area FDA along the second direction (y-axis direction). In addition, the length of the first non-folding area NFA1 along the first direction (x-axis direction) may be larger than the length of the folding area FDA along the first direction (x-axis direction). The length of the second non-folding area NFA2 along the first direction (x-axis direction) may be larger than the length of the folding area FDA along the first direction (x-axis direction).

A first screen area ID1 may be disposed on one side of the front surface of the display device 10. The first screen area ID1 may overlap a folding area FDA and a second non-folding area NFA2. Therefore, when the display device 10 is unfolded, images may be displayed on the front side of the folding area FDA, the first non-folding area NFA1 and the second non-folding area NFA2 of the display device 10.

A second screen area ID2 may be disposed on the opposite side of the front surface of the display device 10. The second screen area ID2 may overlap the first non-folding area NFA1. Therefore, when the display device 10 is unfolded, images may be displayed on the front side of the first non-folding area NFA1 of the display device 10.

The first non-folding area NFA1 or the second non-folding area NFA2 may include a first display area DA1, a second display area DA2 and a third display area DA3. At least two of the first display area DA1, the second display area DA2 and the third display area DA3 may have different areas. For example, the first display area DA1 may be larger than the second display area DA2 and the third display area DA3. At least two of the first display area DA1, the second display area DA2 and the third display area DA3 may have the same area. For example, the second display area DA2 and the third display area DA3 may have the same area. However, the areas of the first display area DA1, the second display area DA2 and the third display area DA3 of the display panel 100 are not limited to those shown in FIG. 1, and for example, the display area DA1, the second display area DA2 and the third display area DA3 may have different areas. A notch area NTA (or a cutout) may be formed between the second display area DA2 and the third display area DA3 of the display panel 100. The notch area NTA may be formed by cutting or removing a part of the display panel 100. Although the notch area NTA is located in the first non-folding area NFA1 in the example shown in FIGS. 15 and 16, the present disclosure is not limited thereto.

Figure 17:
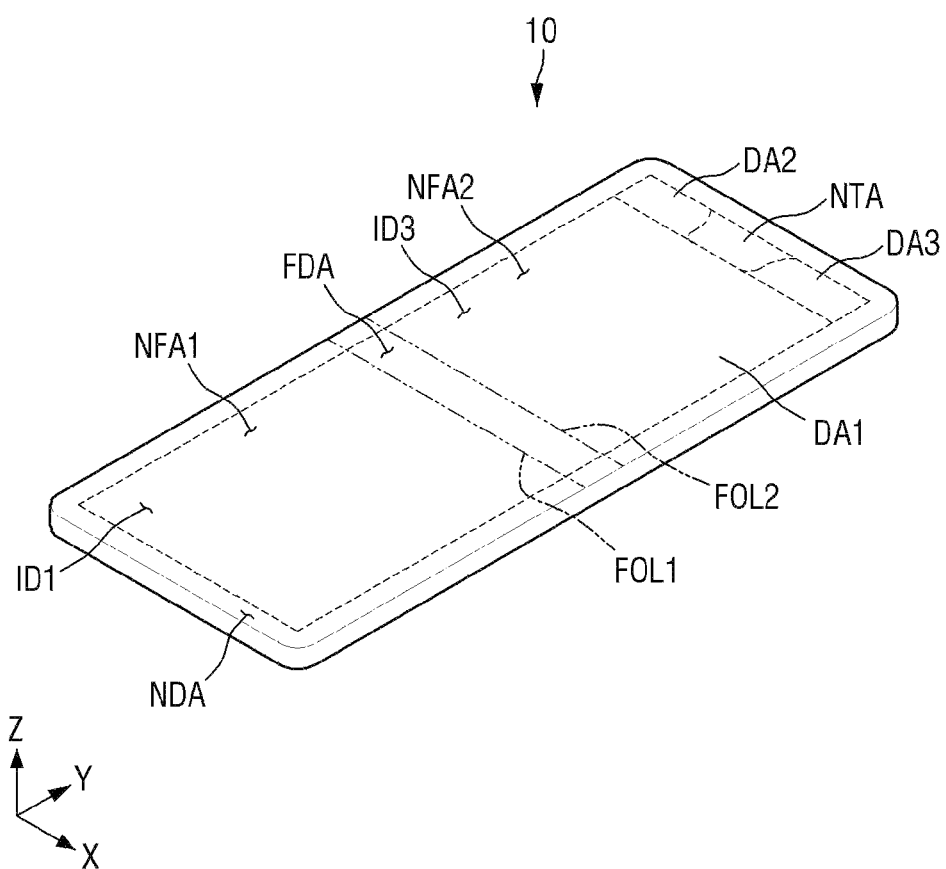
FIGS. 17 and 18 are perspective views showing a display device according to still another embodiment of the present disclosure.
Figure 18:
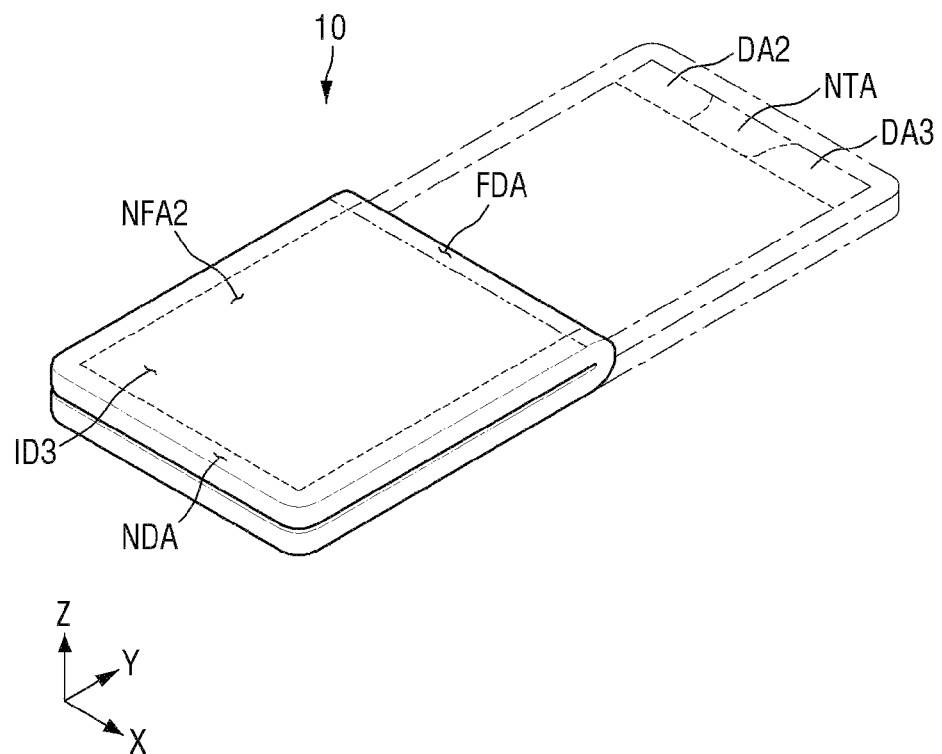

FIGS. 17 and 18 are perspective views showing a display device according to still another embodiment of the present disclosure.

In the example shown in FIGS. 17 and 18, a display device 10 is a foldable display device that is folded along the first direction (x-axis direction). The display device 10 may remain folded as well as unfolded. The display device 10 may be folded inward (in-folding manner) such that the front surface is located inside. When the display device 10 is bent or folded in the in-folding manner, a part of the front surface of the display device 10 may face the other part of the front surface of the display device 10. Alternatively, the display device 10 may be folded outward (out-folding manner) such that the front surface is located outside. When the display device 10 is bent or folded in the out-folding manner, a part of the rear surface of the display device 10 may face the other part of the rear surface of the display device 10.

The display device 10 may include a folding area FDA, a first non-folding area NFA1, and a second non-folding area NFA2. The display device 10 can be folded at the folding area FDA, while it cannot be folded at the first non-folding area NFA1 and the second non-folding area NFA2.

The first non-folding area NFA1 may be disposed on one side, for example, the lower side of the folding area FDA. The second non-folding area NFA2 may be disposed on the other side, for example, the upper side of the folding area FDA. The folding area FDA may be an area bent with a predetermined curvature over the first folding line FOL1 and the second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

The first folding line FOL1 and the second folding line FOL2 may extend along the first direction (x-axis direction) as shown in FIGS. 17 and 18, and the display device 10 may be folded along the first direction (x-axis direction). As a result, the length of the display device 10 in the second direction (the y-axis direction) may be reduced to about half, so that the display device 10 is easy to carry.

The direction in which the first folding line FOL1 and the second folding line FOL2 extend is not limited to the first direction (x-axis direction). For example, the first folding line FOL1 and the second folding line FOL2 may extend along the second direction (y-axis direction), and the display device 10 may be folded along the second direction (y-axis direction). In such case, the length of the display device 10 along the first direction (x-axis direction) may be reduced to about half. Alternatively, the first folding line FOL1 and the second folding line FOL2 may extend along a diagonal direction of the display device 10 between the first direction (x-axis direction) and the second direction (y-axis direction). In such case, the display device 10 may be folded in a triangle shape.

When the first folding line FOL1 and the second folding line FOL2 extend along the first direction (x-axis direction) as shown in FIGS. 17 and 18, the length of the folding area FDA along the second direction (y-axis direction) may be smaller than the length of the folding area FDA along the first direction (x-axis direction). In addition, the length of the first non-folding area NFA1 along the second direction (y-axis direction) may be larger than the length of the folding area FDA along the second direction (y-axis direction). The length of the second non-folding area NFA2 along the second direction (y-axis direction) may be larger than the length of the folding area FDA along the second direction (y-axis direction).

A first screen area ID1 may be disposed on the front surface of the display device 10. The first screen area ID1 may overlap a folding area FDA and a first non-folding area NFA1. Therefore, when the display device 10 is unfolded, images may be displayed on the front side of the folding area FDA, the first non-folding area NFA1 and the second non-folding area NFA2 of the display device 10.

A second screen area ID2 may be disposed on the front surface of the display device 10. The second screen area ID2 may overlap the second non-folding area NFA2. Therefore, when the display device 10 is unfolded, images may be displayed on the front surface of the second non-folding area NFA2 of the display device 10. The first non-folding area NFA1 or the second non-folding area NFA2 may include a first display area DA1, a second display area DA2 and a third display area DA3. At least two of the first display area DA1, the second display area DA2 and the third display area DA3 may have different areas. For example, the first display area DA1 may be larger than the second display area DA2 and the third display area DA3. At least two of the first display area DA1, the second display area DA2 and the third display area DA3 may have the same area. For example, the second display area DA2 and the third display area DA3 may have the same area. However, the areas of the first display area DA1, the second display area DA2 and the third display area DA3 of the display panel 100 are not limited to those shown in FIG. 17, and for example, the display area DA1, the second display area DA2 and the third display area DA3 may have different areas. A notch area NTA (or a cutout) may be formed between the second display area DA2 and the third display area DA3 of the display panel 100. The notch area NTA may be formed by cutting or removing a part of the display panel 100.

Although the notch area NTA (or the cutout) is located in the second non-folding area NFA2 in the example shown in FIGS. 17 and 18, the present disclosure is not limited thereto.

In concluding the detailed description, those skilled in the art will appreciate that many variations and modifications can be made to the preferred embodiments without substantially departing from the principles of the present inventive concept. Therefore, the disclosed preferred embodiments of the inventive concept are used in a generic and descriptive sense only and not for purposes of limitation.

What is claimed is:
1. A display device comprising:
a display panel comprising a display area that includes a first display area, a second display area disposed adjacent to one side of the first display area, and a third display area disposed adjacent to the one side of the first area to be spaced apart from the second display area with a notch area disposed therebetween;
a touch detector formed on a front surface of the first to third display areas to sense a user's touch;
a scan driver circuit sequentially supplying scan signals to scan lines of the first to third display areas, respectively; and
a touch driver circuit supplying a touch driving signal to touch electrodes of the touch detector,
wherein the touch driver circuit changes a pulse width or an output timing of the touch driving signal while images are displayed on at least one of the first to third display areas and supplies the touch driving signal to the touch electrodes.

2. The display device of claim 1, wherein an area of each of the second and third display areas is smaller than an area of the first display area, and
wherein the scan driver circuit sequentially supplies scan signals corresponding to scan lines of the second and third display areas, and then sequentially supplies scan signals corresponding to scan lines of the first display area.

3. The display device of claim 1, wherein the touch driver circuit generates the touch driving signal in a form of pulses which swings at least once during each horizontal line driving period and supplies the touch driving signal to the touch electrodes at least once during the each horizontal line driving period, and
wherein the pulse width of the touch driving signal is smaller than the each horizontal line driving period of a horizontal synchronization signal.

4. The display device of claim 3, wherein the touch driver circuit generates the touch driving signal so that the touch driving signal is overlapped with a supply period of at least one of first to third scan signals while the first to third scan signals are supplied to first to third scan lines of the second and third display areas, and supplies the touch driving signal to the touch electrodes.

5. The display device of claim 4, wherein the touch driver circuit generates the touch driving signal so that a rising edge of the touch driving signal is overlapped with the supply period of at least one of the first to third scan signals and supplies the touch driving signal to the touch electrodes.

6. The display device of claim 3, wherein the touch driver circuit generates the touch driving signal so that the touch driving signal is overlapped with a supply period of a second scan signal while the first to third scan signals are supplied to first to third scan lines of the second and third display areas, and supplies the touch driving signal to the touch electrodes.

7. The display device of claim 6, wherein the touch driver circuit generates the touch driving signal so that a rising edge of the touch driving signal is overlapped with the supply period of the second scan signal and supplies the touch driving signal to the touch electrodes.

8. The display device of claim 1, wherein the scan driver circuit generates the scan signals so that a pulse width of first to third scan signals applied to sub-pixels of the second and third display areas is smaller than a pulse width of first to third scan signals applied to sub-pixels of the first display area and supplies the scan signals corresponding to the second and third display areas to first to third scan signal lines of the second and third display areas.

9. The display device of claim 8, wherein the touch driver circuit generates the touch driving signal so that a pulse width of the touch driving signal generated while images are displayed on the second and third display areas is larger than a pulse width of the touch driving signal generated while images are displayed on the first display area, and
wherein the touch driver circuit supplies the touch driving signal so that a rising edge of the touch driving signal is overlapped with the supply period of one of the first to third scan signals while the first to third scan signals are supplied to the first to third scan lines of the second and third display areas.

10. The display device of claim 8, wherein the touch driver circuit generates the touch driving signal so that a pulse width of the touch driving signal generated while images are displayed on the second and third display areas is smaller than a pulse width of the touch driving signal generated while images are displayed on the first display area, and
wherein the touch driver circuit supplies the touch driving signal so that a rising edge of the touch driving signal is overlapped with the supply period of one of the first to third scan signals while the first to third scan signals are supplied to the first to third scan lines of the second and third display areas.

11. The display device of claim 8, wherein the touch driver circuit delays the touch driving signal by a predetermined delay period while the first to third scan signals are sequentially supplied to first to third scan lines of the second and third display areas, and
wherein the touch driver circuit supplies the touch driving signal to the touch electrodes so that a rising edge of the touch driving signal is overlapped with a supply period of one of the first to third scan signals while the first to third scan signals are supplied to first to third scan lines of the second and third display areas.

12. The display device of claim 8, wherein the touch driver circuit generates the touch driving signal so that a pulse width of the touch driving signal generated while images are displayed on the first display area is larger than or smaller than a pulse width of the touch driving signal generated while images are displayed on the second and third display areas, and
wherein the touch driver circuit outputs the touch driving signal so that a rising edge of the touch driving signal is overlapped with a supply period of the scan signals while images are displayed on the first display area.

13. A display device comprising:
a display panel comprising a display area that includes a first display area, a second display area disposed adjacent to one side of the first display area, and a third display area disposed adjacent to the one side of the first area to be spaced apart from the second display area with a notch area disposed therebetween;
a touch detector formed on a front surface of the first to third display areas to sense a user's touch;
a scan driver circuit changing a pulse width of scan signals while images are displayed on at least one of the first to third display areas and supplying the scan signals to scan lines of the first to third display areas; and
a touch driver circuit changing a pulse width or output timing of the touch driving signal while images are displayed on at least one of the first to third display areas and supplying the touch driving signal to touch electrodes of the touch detector.

14. The display device of claim 13, wherein the scan driver circuit generates the scan signals so that a pulse width of first to third scan signals applied to sub-pixels of the second and third display areas is smaller than a pulse width of first to third scan signals applied to sub-pixels of the first display area and supplies the scan signals to first to third scan signal lines of the second and third display areas.

15. The display device of claim 14, wherein the touch driver circuit generates the touch driving signal so that a falling edge of the touch driving signal is overlapped with a supply period of at least one of first to third scan signals while the first to third scan signals are supplied to first to third scan lines of the second and third display areas, and supplies the touch driving signal to the touch electrodes.

16. The display device of claim 14, wherein the touch driver circuit generates the touch driving signal so that a falling edge of the touch driving signal is overlapped with a supply period of the second scan signal while the first to third scan signals are supplied to first to third scan lines of the second and third display areas, and supplies the touch driving signal to the touch electrodes.

17. The display device of claim 14, wherein the touch driver circuit generates the touch driving signal so that a pulse width of the touch driving signal generated while images are displayed on the second and third display areas is larger than a pulse width of the touch driving signal generated while images are displayed on the first display area, and wherein the touch driver circuit supplies the touch driving signal so that a falling edge of the touch driving signal is overlapped with a supply period of one of the first to third scan signals while the first to third scan signals are supplied to first to third scan lines of the second and third display areas.

18. The display device of claim 14, wherein the touch driver circuit generates the touch driving signal so that a pulse width of the touch driving signal generated while images are displayed on the second and third display areas is smaller than a pulse width of the touch driving signal generated while images are displayed on the first display area, and wherein the touch driver circuit supplies the touch driving signal so that a falling edge of the touch driving signal is overlapped with a supply period of one of the first to third scan signals while the first to third scan signals are supplied to first to third scan lines of the second and third display areas.

19. The display device of claim 14, wherein the touch driver circuit generates and delays the touch driving signal by a predetermined delay period while the first to third scan signals are sequentially supplied to first to third scan lines of the second and third display areas, and wherein the touch driver circuit supplies the touch driving signal to the touch electrodes so that a falling edge of the touch driving signal is overlapped with a supply period of one of the first to third scan signals while the first to third scan signals are supplied to first to third scan lines of the second and third display areas.

20. The display device of claim 14, wherein the touch driver circuit generates the touch driving signal so that a pulse width of the touch driving signal generated while images are displayed on the first display area is larger than or smaller than a pulse width of the touch driving signal generated while images are displayed on the second and third display areas, and wherein the touch driver circuit outputs the touch driving signal so that a falling edge of the touch driving signal is overlapped with a supply period of the scan signals while images are displayed on the first display area.

* * * * *